(12) United States Patent
Andrews et al.

(10) Patent No.: US 12,438,173 B2
(45) Date of Patent: Oct. 7, 2025

(54) PROTON FLOW REACTOR SYSTEM

(71) Applicant: ROYAL MELBOURNE INSTITUTE OF TECHNOLOGY, Melbourne (AU)

(72) Inventors: John Andrews, Avonsleigh (AU); Gary Rosengarten, Caulfield North (AU); Seyed Mohammad Rezaei Niya, South Morang (AU); Shahin Heidari, Doncaster East (AU); Francois du Toit, Ascot Vale (AU); Bahman Shabani, Donvale (AU); Ruchika Ojha, Melbourne (AU); Alireza Heidarian, South Bank (AU); Saeed Seif Mohammadi, Doreen (AU)

(73) Assignee: ROYAL MELBOURNE INSTITUTE OF TECHNOLOGY, Melbourne (AU)

( * ) Notice: Subject to any disclaimer, the term of this patent is extended or adjusted under 35 U.S.C. 154(b) by 543 days.

(21) Appl. No.: 18/012,424

(22) PCT Filed: Jun. 25, 2021

(86) PCT No.: PCT/AU2021/050670
§ 371 (c)(1),
(2) Date: Dec. 22, 2022

(87) PCT Pub. No.: WO2021/258157
PCT Pub. Date: Dec. 30, 2021

(65) Prior Publication Data
US 2023/0178779 A1  Jun. 8, 2023

(30) Foreign Application Priority Data

Jun. 25, 2020 (AU) .................. 2020902128

(51) Int. Cl.
*H01M 8/06* (2016.01)
*C25B 1/04* (2021.01)
(Continued)

(52) U.S. Cl.
CPC ............. *H01M 8/0693* (2013.01); *C25B 1/04* (2013.01); *H01M 8/04291* (2013.01); *H01M 8/1039* (2013.01); *H01M 16/003* (2013.01)

(58) Field of Classification Search
CPC .......... H01M 8/0693; H01M 8/04291; H01M 8/1039; H01M 16/003; C25B 1/04
(Continued)

(56) References Cited

U.S. PATENT DOCUMENTS 3,520,728 A     7/1970  Beccu
2003/0108474 A1  6/2003  Negishi et al.
(Continued)

FOREIGN PATENT DOCUMENTS

CN    1378521 A    11/2002
CN    102119461 A   7/2011
(Continued)

OTHER PUBLICATIONS

Extended European Search Report in corresponding European patent application serial No. 21828471.9 dated Feb. 13, 2025.
(Continued)

*Primary Examiner* — James M Erwin
(74) *Attorney, Agent, or Firm* — Westman, Champlin & Koehler, P.A.

(57) ABSTRACT

The invention relates to a proton flow reactor for use in storing and releasing energy. In use, a slurry of storage particles in a liquid electrolyte may pass through a first half cell of the proton flow reactor. When the proton flow reactor is in charge mode, protons are bonded or otherwise attracted to the storage particles to form charged storage particles charged with hydrogen, which can hen be stored and/or transported for later use. When the proton flow reactor is in discharge mode, protons are removed from the charged storage particles to fuel an electrochemical reaction, thereby (Continued)

generating electricity. Alternatively, the proton flow reactor in discharge mode can be configured to generate hydrogen gas directly from the in-flowing charged carbon particles.

53 Claims, 12 Drawing Sheets

(51) Int. Cl.
    *H01M 8/04291*    (2016.01)
    *H01M 8/1039*     (2016.01)
    *H01M 16/00*      (2006.01)

(58) Field of Classification Search
    USPC .......................................................... 429/408
    See application file for complete search history.

(56) References Cited

U.S. PATENT DOCUMENTS

| | | | |
|---|---|---|---|
| 2007/0048579 | A1 | 3/2007 | Bae |
| 2014/0028261 | A1* | 1/2014 | Esswein ............ H01M 8/04276 320/128 |
| 2014/0080026 | A1 | 3/2014 | Cheng et al. |
| 2014/0154546 | A1 | 6/2014 | Carter et al. |
| 2016/0164152 | A1 | 6/2016 | Tan et al. |
| 2017/0133701 | A1* | 5/2017 | Kout ................. H01M 8/04089 |
| 2018/0034081 | A1 | 2/2018 | Gomez |
| 2019/0355998 | A1 | 11/2019 | Chiang et al. |
| 2020/0400614 | A1* | 12/2020 | Deng ................... G01N 29/032 |

FOREIGN PATENT DOCUMENTS

| | | |
|---|---|---|
| CN | 102800877 A | 11/2012 |
| CN | 103503201 A | 1/2014 |
| JP | 2001302223 A | 10/2001 |
| JP | 2001316104 A | 11/2001 |
| JP | 2015023019 A | 2/2015 |

OTHER PUBLICATIONS

Babel, K. & Jurewicz, K. "KOH Activated Lignin Based Nanostructured Carbon Exhibiting High Hydrogen Electrosorption", Carbon, 2008, pp. 1948-1956, vol. 46.

Bleda-Martínez et al. "Effect of Surface Chemistry on Electrochemical Storage of Hydrogen in Porous Carbon Materials", Carbon, 2008, pp. 1053-1059, vol. 46.

Cheng, C. & Li, D. "Solvated Graphenes: An Emerging Class of Functional Soft Materials", Advanced Materials, 2013, pp. 13-30, vol. 25.

Du et al. "First-Principles Prediction of Metal-free Magnetism and Intrinsic Half-Metallicity in Graphitic Carbon Nitride", Physical Review Letters, 2012, pp. 197207-1-197207-5, vol. 108.

Elias et al. "Control of Graphene's Properties by Reversible Hydrogenation: Evidence for Graphane", Science, Jan. 30, 2009, pp. 610-613, vol. 323.

Fang et al. "Ordered Porous Carbon With Tailored Pore Size for Electrochemical Hydrogen Storage Application", The Journal of Physical Chemistry B, 2006, pp. 4875-4880, vol. 110.

Figueiredo et al. "Modification of the Surface Chemistry of Activated Carbons", Carbon, 1999, pp. 1379-1389, vol. 37.

Gupta et al. "Role of Oxygen Functional Groups Reduced Graphene Oxide for Lubrication", Scientific Reports, 2017, pp. 45030, vol. 7.

Heidari et al. "Technical Feasibility of a Proton Battery with an Activated Carbon Electrode", International Journal of Hydrogen Energy, 2018, pp. 6197-6209, vol. 43.

Heo et al. "H2O2/Steam Activation as an Eco-friendly and Efficient Top-down Approach to Enhancing Porosity on Carbonaceous Materials: The Effect of Inevitable Oxygen Functionalities on CO2 Capture", Green Chemistry, 2018, pp. 5224-5234, vol. 20.

Isikli et al. "Influence of Quinone Grafting via Friedel-Crafts Reaction on Carbon Porous Structure and Supercapacitor Performance", Carbon, 2014, pp. 654-661, vol. 66.

Jurewicz, K. "Influence of Charging Parameters on the Effectiveness of Electrochemical Hydrogen Storage in Activated Carbon", International Journal of Hydrogen Energy, 2009, pp. 9431-9435, vol. 34.

Jurewicz et al. "Enhancement of Reversible Hydrogen Capacity Into Activated Carbon Through Water Electrolysis", Electrochemical and Solid-State Letters, 2001, pp. A27-A29, vol. 4, No. 3.

Jurewicz et al. "Electrochemical Storage of Hydrogen in Activated Carbons", Fuel Processing Technology, 2002, pp. 415-421, vol. 77-78.

Lahaye, J. "The Chemistry of Carbon Surfaces", Fuel, 1998, pp. 543-547, vol. 77, No. 6.

Montes-Morán et al. "On the Nature of Basic Sites on Carbon Surfaces: An Overview", Carbon, 2004, pp. 1219-1225, vol. 42.

Mourshed et al. "Carbon-Based Slurry Electrodes for Energy Storage and Power Supply Systems", Energy Storage Materials, 2021, pp. 461-489, vol. 40.

Nevskaia, D. & Martín-Aranda, R. "Nitric Acid-Oxidized Carbon for the Preparation of Esters Under Ultrasonic Activation", Catalysis Letters, Apr. 2003, pp. 143-147, vol. 87, Nos. 3-4.

Pels et al. "Evolution of Nitrogen Functionalities in Carbonaceous Materials During Pyrolysis", Carbon, 1995, pp. 1641-1653, vol. 33, No. 11.

Pognon et al. "Effect of Molecular Grafting on the Pore Size Distribution and the Double Layer Capacitance of Activated Carbon for Electrochemical Double Layer Capacitors", Carbon, 2011, pp. 1340-1348, vol. 49.

Pognon et al. "Performance and Stability of Electrochemical Capacitor Based on Anthraquinone Modified Activated Carbon", Journal of Power Sources, 2011, pp. 4117-4122, vol. 196.

Roldán et al. "Towards a Further Generation of High-energy Carbon-based Capacitors by Using Redox-active Electrolytes", Angewandte Chemie Int. Ed., 2011, pp. 1699-1701, vol. 50.

Roldán et al. "Redox-active Electrolyte for Carbon Nanotube-based Electric Double Layer Capacitor", Electrochimica Acta, 2011, pp. 3401-3405, vol. 56.

Roldán et al. "Mechanisms of Energy Storage in Carbon-Based Supercapacitors Modified with a Quinoid Redox-Active Electrolyte", Journal of Physical Chemistry C, 2011, pp. 17606-17611, vol. 115.

Shafeeyan et al. "A Review on Surface Modification of Activated Carbon for Carbon Dioxide Adsorption", Journal of Analytical and Applied Pyrolysis, 2010, pp. 143-151, vol. 89.

Shanbhag et al. "The Origins of Low Efficiency in Electrochemical De-Ionization Systems" 2016 Journal of Electrochemical Society, 2016, pp. E363-E371, vol. 163.

Sofo et al. "A Two-Dimensional Hydrocarbon", Physical Review B, 2007, pp. 153401-1-153401-4, vol. 75.

Tan et al. "Charge Modulation in Graphitic Carbon Nitride as a Switchable Approach to High-Capacity Hydrogen Storage", ChemSusChem, 2015, pp. 3626-3631, vol. 8.

Toyota. 2016. Fuel cell vehicle technology file http://www.toyota-global.com/innovation/environmental_technology/technology_file/fuel_cell_hybrid.html#h306 (archived May 2, 2020 at https://web.archive.org/web/20160316234317/http://www.toyota-global.com/innovation/environmental_technology/technology_file/fuel_cell_hybrid.html).

Toyota, 2017, 2017 Mirai Product Information, accessed from https://www.toyota.com/mirai/assets/core/Docs/Mirai%20Specs.pdf.

Vix-Guterl et al. "Electrochemical Energy Storage in Ordered Porous Carbon Materials", Carbon, 2005, pp. 1293-1302, vol. 43.

Yang et al. "Electrochemical Hydrogen Storage Behavior of Single-Walled Carbon Nanotubes (SWCNTs) Coated with Ni Nanoparticles", International Journal of Hydrogen Energy, 2010, pp. 2336-2343, vol. 35.

Yang et al. "Capacitive Performance of a Heteroatom-enriched Activated Carbon in Concentrated Sulfuric Acid", Journal of Power Sources, 2013, pp. 553-560, vol. 239.

(56) References Cited

OTHER PUBLICATIONS

International Search Report and Written Opinion in corresponding International Application No. PCT/AU2021/050670 dated Aug. 17, 2021.
Office Action in corresponding Chinese patent application serial No. 202180052848.7 dated Jun. 28, 2025.

* cited by examiner (a)

(b)

(a)

(b)

(c)

PROTON FLOW REACTOR SYSTEM

CROSS-REFERENCE TO RELATED APPLICATION(S)

The present application is a § 371 national phase entry of PCT International patent application Serial No. PCT/AU2021/050670, filed Jun. 25, 2021, and published in English, and further claims priority to Australian Patent Application No. 2020902128, filed Jun. 25, 2020.

FIELD

The present invention is generally directed to a proton flow reactor system with a slurry electrode comprising particles in a liquid electrolyte.

BACKGROUND

Electrochemical cells are devices that convert electrical energy into chemical energy or vice versa. Electrochemical cells which produce electric current are commonly called voltaic or galvanic cells, while electrochemical cells that use an electric current to generate chemical reactions are commonly called electrolytic cells, A device comprising a number of connected voltaic cells, whether in series or in parallel, is commonly called a battery while an electrochemical device in which reactants are continuously delivered to the device is commonly called a fuel cell. Another type of device is a flow battery, in which one or both electrodes of the cell have a continuous flow of material, usually in liquid form, that is successively charged and discharged, Additional electrode material is stored externally, commonly in tanks, and is typically circulated through the cell(s) using a pump.

Electrochemical cells such as fuel cells have received increased attention in recent times as an efficient and environmentally friendly alternative to traditional power sources such as combustion engines and generators. Power systems which allow for zero or reduced emissions of greenhouse gases and the like are considered vital to enable continued use of powered systems including powered transport via road, rail or sea.

One form of fuel cell is the proton-exchange membrane fuel cell ('PEMFC'). In a PEMFC a proton-exchange membrane ('PEM'), commonly comprising a polymer such as Nafion™ as the electrolyte, separates the anode side from the cathode side. In a typical PEMFC hydrogen gas is delivered to the anode side where it is separated into protons and electrons. The separated protons may travel through the PEM to the cathode side where they react with oxygen to form water, thereby generating electricity.

The storage of fuels or reactants for cleaner energies is an ongoing concern, particularly where one or more of the reactants is provided as a gas. Taking PEMFCs as an example, the reactants utilised are commonly gaseous oxygen and hydrogen. While local air may be used as a source of oxygen, nevertheless purified oxygen requiring storage may be required for certain fuel cell configurations. Hydrogen gas can also be difficult to store, and several options have been developed to manage this issue, including pressurised hydrogen gas storage, More generally techniques developed to store hydrogen for use in combustion systems and fuel cells have included: pressurised hydrogen storage, liquified hydrogen storage, and storage as a metal hydride prior to delivery as hydrogen gas. In any electrical energy storage system, 'round-trip' energy efficiency (which accounts for preparing hydrogen for storage) is a very relevant consideration. A process exists in which an electrolyser produces hydrogen gas by water splitting, the hydrogen is stored as gas, and a fuel cell utilises the gas to produce electricity. This process can provide a relatively low round-trip energy efficiency of typically less than 50%. This compares unfavourably with other energy storage means, such as lithium batteries, which provide a round-trip efficiency of above 80% for short-duration storage.

Despite developments in this area, improved techniques to store fuels or reactants such as hydrogen are still being sought. Desirably, such techniques would provide for storage involving one or more of: low volume; low additional weight; low costs; and suitable energy efficiency.

Heidari, et al., 'Technical Feasibility of a Proton Battery with an Activated Carbon Electrode', *International Journal of Hydrogen Energy* 43 (2018) 6197-6209 ('Heidari') the entire disclosure of which is herein incorporated, discloses development of a small-scale 'proton battery', which it describes as a reversible PEMFC with an integrated solid-state electrode for storing hydrogen in atomic form. Heidari describes a proton battery as a hybrid between a hydrogen fuel cell system and a battery-based system, since it involves a fuel source captured within a solid-state electrode within the device.

According to Heidari, the first proton battery was basically a regenerative PEMFC with an integrated solid-state electrode for storing atomic hydrogen, such that:
  during electrolysis (or 'charge mode') protons are produced and conducted through the PEM and enter the solid-state electrode where they are neutralised by excess electrons to form hydrogen atoms bonded with the electrode material;
  during galvanic operation (or 'discharge mode') stored protons return through the PEM to the oxygen side where they combine with oxygen and electrons from the external circuit to re-form water, thereby generating electricity.

Heidari notes that the first solid state electrodes for storage of hydrogen comprised expensive metal alloys of predominantly nickel, cobalt, lanthanum and cerium. Heidari then proposes porous carbon as a potential alternative to metal electrodes, in which atomic hydrogen is stored during electrolysis within the porous carbon electrode. FIG. 1 shows a proton battery design 100 according to Heidari, in which a carbon electrode 116 is provided in one side of the 'battery' while the other side of the battery incorporates an oxygen side comprising flow channels 104 for travel of air. The proton battery 100 is generally book-ended by stainless steel end plates 102, 120 clamped together by bolts 122. Between the end plates 102, 120 and commencing from the oxygen side there is provided a silicone sealing gasket 106, a porous sintered titanium felt 108 for use as a gas diffusion layer material, a catalyst material 110 formed of iridium/ruthenium oxide and platinum black, a Nafion PEM 114, an activated carbon electrode 116 soaked in sulphuric acid and a stainless-steel mesh to support the electrode 118.

Heidari concludes that the gravimetric density of hydrogen storage on a material basis at atmospheric pressure is already comparable with metal hydride hydrogen storage techniques involving hydrogen gas pressures of 10 bar or higher, but is less competitive in comparison to storage of hydrogen gas compressed to 700 bar. Heidari refers to further areas for research including use of novel graphene-based materials within storage electrodes, and optimising charging and discharging techniques (including to reduce the rate of formation of hydrogen gas and to improve the kinetics of the hydrogen storage process).

Despite continuing advances in alternative energy production and storage techniques it remains desirable to provide new systems for energy production and storage as alternatives to traditional fossil fuel combustion systems.

The reference in this specification to any prior publication, or information derived from it, or to any matter which is known, is not, and should not be taken as an acknowledgement or admission or any form of suggestion that the prior publication, or information derived from it, or known matter forms part of the common general knowledge in the field of endeavour to which this specification relates.

SUMMARY

According to a first aspect of the invention, there is provided a method of storing electrical energy as chemical energy, the method comprising:
  supplying an input slurry comprising uncharged storage particles and electrolyte to a first half-cell of an electrochemical cell;
  supplying a source of $H^+$ or $H_3O^+$ ions to a second half-cell of the electrochemical cell;
  applying a voltage to the electrochemical cell to:
    allow $H^+$ or $H_3O^+$ ions to pass from the second half cell to the first half-cell; and
    convert the uncharged storage particles to charged storage particles; and
  removing an output slurry comprising charged storage particles and electrolyte from the first half-cell.

In an embodiment according to the first aspect, the uncharged storage particles possess one or more of the following properties:
  (A) high electrical conductivity;
  (B) an average diameter of between 0.5 and 5 microns;
  (C) a porosity in the range 20% to 50%;
  (D) substantial 'ultramicropores' with a diameter between 0.5 and 2 nanometres (nm) or substantial layered domains with an interlayer spacing between 0.5 and 2 nm;
  (E) mesopores with a diameter or width between 2 and 50 nm;
  (F) and an electrochemical hydrogen storage capacity of between 0.5 and 8 wt %.

In an embodiment according to the first aspect, the uncharged storage particles possess each of above properties (A)-(F).

In an embodiment according to the first aspect, the uncharged storage particles comprise carbon particles.

In an embodiment according to the first aspect, the carbon particles are selected from particles formed predominantly from one or more of the following materials: activated carbon, graphene, graphene functionalised with oxygen, graphene functionalised or doped with nitrogen, graphitic carbon nitrides, graphene aerogel, or carbon nanotubes.

In an embodiment according to the first aspect, the carbon particles comprise particles derived from phenolic resin and activated with potassium hydroxide.

In an embodiment according to the first aspect, the input slurry comprises 5-35%), optionally 5-15% (w/w) or 15-35% (w/w), of uncharged storage particles, In an embodiment according to the first aspect, the source of $H^+$ or $H_3O^+$ ions supplied to the second half-cell is water, In an embodiment according to the first aspect, the method further comprises:
  mixing uncharged storage particles and electrolyte to form the input slurry outside the first half-cell; and
  supplying the mixed input slurry to the first half-cell In an embodiment according to the first aspect, the method further comprises separating charged storage particles from electrolyte in the output slurry after removing the output slurry from the first half-cell.

In an embodiment according to the first aspect, the step of separating charged storage particles from electrolyte comprises filtering the charged storage particles from the electrolyte, optionally using a moving filtration membrane.

In an embodiment according to the first aspect, the step of separating the charged storage particles from electrolyte comprises drying the charged storage particles In an embodiment according to the first aspect, the step of drying the charged storage particles comprises applying an inert gas to the charged storage particles.

In an embodiment according to the first aspect, the method further comprises storing the charged storage particles after separating the charged particles from electrolyte.

In an embodiment according to the first aspect, during the step of storing the charged particles the charged storage particles are stored in an inert atmosphere.

According to a second aspect of the invention, there is provided a method of generating electricity, the method comprising;
  supplying an input slurry comprising charged storage particles and electrolyte to a first half-cell of an electrochemical cell;
  supplying an oxidant stream to a second half-cell of the electrochemical cell;
  allowing $H^+$ or $H_3O^+$ ions to pass from the first half-cell to react with the oxidant in the second half-cell, thereby generating electricity; and
  removing an output slurry comprising uncharged storage particles and electrolyte from the first half-cell.

In an embodiment according to the second aspect, the charged storage particles possess one or more of the following properties:
  (A) high electrical conductivity;
  (B) an average diameter of between 0.5 and 5 microns;
  (C) a porosity in the range 20% to 50%;
  (D) substantial 'ultramicropores' with a diameter between 0.5 and 2 nanometres (nm) or substantial layered domains with an interlayer spacing between 0.5 and 2 nm;
  (E) mesopores with a diameter or width between 2 and 50 nm;
  (F) and an electrochemicai hydrogen storage capacity of between 0.5 and 8 wt %.

In an embodiment according to the second aspect, the charged storage particles possess all of properties (A)-(F).

In an embodiment according to the second aspect, the charged storage particles comprise carbon particles.

In an embodiment according to the second aspect, the carbon particles are selected from particles formed predominantly from one or more of the following materials: activated carbon, graphene, graphene functionalised with oxygen, graphene functionalised or doped with nitrogen, graphitic carbon nitrides, graphene aerogel, or carbon nanotubes, In an embodiment according to the second aspect, the carbon particles comprise particles derived from phenolic resin and activated with potassium hydroxide.

In an embodiment according to the second aspect, the input slurry comprises 5-35% (w/w), optionally 5-15% (w/w) or 15-35% (w/w), of uncharged storage particles.

In an embodiment according to the second aspect, the charged storage particles have been produced and processed according to the first aspect of the invention.

In an embodiment according to the second aspect, the oxidant stream supplied to the second half-cell comprises oxygen gas.

In an embodiment according to the second aspect, the oxidant stream supplied to the second half-cell is air.

In an embodiment according to the second aspect, the method comprises a step of heating the cell while generating electricity.

In an embodiment according to the second aspect, the method further comprises:
  mixing charged storage particles and electrolyte to form the input slurry outside the first half-cell; and
  supplying the mixed input slurry to the first half-cell.

In an embodiment according to the second aspect, the method further comprises separating uncharged storage particles from electrolyte after removing the output slurry from the first half-cell.

In an embodiment according to the second aspect, the step of separating uncharged storage particles from electrolyte comprises drying the uncharged storage particles, In an embodiment according to the second aspect, the method comprises storing the uncharged storage particles after separating the uncharged particles from electrolyte.

In an embodiment according to the first or second aspects, the electrochemical cell comprises a proton exchange membrane separating the first half-cell and the second half cell, the proton exchange membrane optionally comprising a layer formed substantially of a tetrafluoroethylene based fluoropolymer-copolymer.

In an embodiment according to the first or second aspects, the steps of:
  supplying the input slurry to the electrochemical cell; and
  removing the output slurry from the electrochemical cell,
    are performed as a continuous process.

In an embodiment according to the first or second aspects, the steps of;
  supplying the input slurry to the electrochemical cell; and
  removing the output slurry from the electrochemical cell,
    are performed as a batch-wise process.

In an embodiment according to the first or second aspects, the electrolyte is selected from: a mineral acid in aqueous solution, an ionic liquid, an ionic liquid in aqueous solution, an organic acid in aqueous solution, or combinations thereof.

In an embodiment according to the first or second aspects, the method comprises processing the input slurry through a plurality of electrochemical cells arranged in series to produce the output slurry.

In an embodiment according to the first or second aspects, the method comprises processing the input slurry through a plurality of electrochemical cells arranged in parallel to produce the output slurry, optionally the plurality of electrochemical cells is arranged in a stack.

In an embodiment according to the first or second aspects, the charged storage particles comprise on average at least 0.5 wt % of captured hydrogen, optionally 1.0-8.0 wt % of captured hydrogen.

According to a third aspect of the invention, there is provided a charged storage particle produced according to the first aspect.

In an embodiment according to the third aspect, there is provided a slurry comprising the charged storage particle and electrolyte.

In an embodiment according to the third aspect, the charged storage particle is stored in an inert atmosphere.

In a fourth aspect of the invention, there is provided an uncharged storage particle processed according to the second aspect, In an embodiment according to the fourth aspect, there is provided a slurry comprising the uncharged storage particle and electrolyte.

According to a fifth aspect of the invention, there is provided a method of generating hydrogen gas, the method comprising:
  supplying an input slurry comprising charged storage particles and electrolyte to a first half-cell of an electrochemical cell:
  allowing $H^+$ or $H_3O^+$ ions to pass from the first half-cell while ensuring that substantially no oxidant, or minimal oxidant, is present in the second half-cell;
    initiating hydrogen gas evolution in the second half-cell; and
  removing an output stream comprising hydrogen gas from the second half-cell.

In an embodiment according to the fifth aspect, the step of initiating hydrogen gas evolution comprises through one or more of:
  applying a low potential to the electrochemical cell;
  applying mild heat to the electrochemical cell; or
  leaving the cell at rest for at least one hour.

In an embodiment according to the fifth aspect, the step of ensuring that substantially no oxidant, or minimal oxidant, is present in the second half-cell may comprise:
  flooding the second half-cell with water,
  filling the second half-cell with non-oxidising gases such as argon or nitrogen, or
  by applying vacuum to the second half cell.

In an embodiment according to the fifth aspect, the method comprises generating electricity while generating hydrogen gas.

In a sixth aspect of the invention, there is provided a system for performing a method according to the first, second or fifth aspects, the system comprising an electrochemical cell, the electrochemical cell further comprising:
  a first half-cell;
  a second half-cell;
  a proton exchange membrane separating the first half-cell from the second half-cell,
  wherein the first half cell is configured to receive a slurry comprising storage particles and electrolyte.

In an embodiment according to the sixth aspect, the proton exchange membrane comprises a layer formed substantially of a tetrafluoroethylene-based fluoropolymer-copolymer.

In an embodiment according to the sixth aspect, the system further comprises a pump to pump a slurry comprising storage particles and electrolyte into the first half-cell.

In an embodiment according to the sixth aspect, the system comprises a separator configured to:
  receive an output slurry comprising storage particles and electrolyte from the first half-cell; and
  separate storage particles from electrolyte.

In an embodiment according to the sixth aspect, the separator comprises a moving filter membrane.

In an embodiment according to the sixth aspect, the separator comprises a dryer.

In an embodiment according to the sixth aspect, the drier is configured to pass an inert gas through the storage particles, In an embodiment according to the sixth aspect, the system comprises a storage device configured to store storage particles separated from electrolyte, In an embodiment according to the sixth aspect, the storage device is configured to store storage particles in an inert atmosphere.

The present summary is provided only by way of example and not limitation. Other aspects of the present invention will be appreciated in view of the entirety of the present disclosure, including the entire text, claims, and accompanying figures.

GLOSSARY

Throughout this specification and the claims which follow, and unless the context requires otherwise:
- the term "carbon particles" will be understood to mean particles predominantly formed of electrically-conductive carbon-based materials. Without limitation, examples of suitable electrically conductive carbon-based materials include: activated carbon, graphene, graphene oxide, graphene functionalised or doped with nitrogen, graphitic carbon nitrides, graphene aerogel, and carbon nanotubes;
- the term "charged storage particles" will be understood to mean storage particles to which a chemically significant amount of hydrogen atoms or ions are bonded or attached via an electrochemical process;
- the term "uncharged storage particles" will be understood to mean storage particles which are not charged storage particles, and includes previously charged storage particles in which hydrogen atoms or ions bonded or otherwise stored by the particle have been discharged, lost or depleted;
- the term "slurry" will be understood to mean a mixture of particles in liquid with a particulate concentration ranging from as low as 5% (weight particles/weight liquid) right up to a paste consistency of 40-60% (w/w);
- the term "storage particles" will be understood to mean particles suitable for storing hydrogen thereon or therein. Desirably, according to certain embodiments of the invention, a storage particle may possess each of the following qualities: high electrical conductivity; an average diameter of between 0.5 and 5 microns; a porosity in the range 20% to 50%; substantial 'ultra-micropores' with a diameter between 0.5 and 2 nanometres (nm) or substantial layered domains with an interlayer spacing between 0.5 and 2 nm; mesopores with a diameter or width between 2 and 50 nm; and an electrochemical hydrogen storage capacity of between 0.5 and 8 wt %, According to embodiments of the invention, storage particles may be carbon particles. In alternative embodiments, storage particles may be formed substantially of silicon;
- reference to a range of numbers disclosed herein (for example, 1 to 10) is intended to also incorporate reference to all rational numbers within that range (for example, 1, 1.1, 2, 3, 3.9, 4, 5, 6. 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner;
- the term "or" shall be understood to include "and", as context permits;
- the term "(w/w)" will be understood to mean weight of particles over weight of electrolyte;
- the term "comprise", and variations such as "comprises" or "comprising", will be understood to imply the inclusion of a stated integer or step or group of integers or steps but not the exclusion of any other integer or step or group of integers or steps'; and
- terms such as "side," "end," "top," "bottom,", "above," "below," and the like are only used to describe elements as they relate to one another, but are in no way meant to recite specific orientations of the device, to indicate or imply necessary or required orientations of the device, or to specify how the invention described herein will be used, mounted, displayed, or positioned in use.

Figure 1:
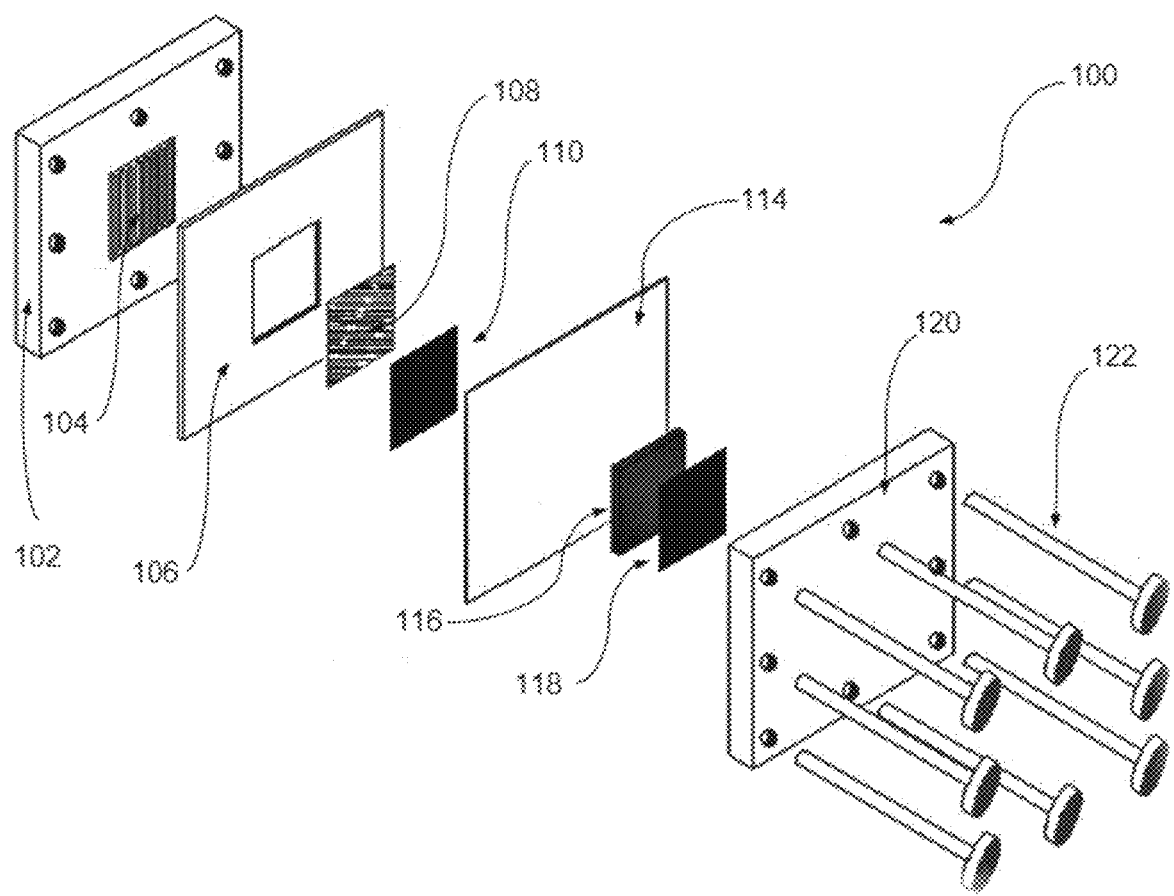
FIG. 1 shows a proton battery as described in Heidari.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps, and/or components not specifically shown in the drawings.

LIST OF COMPONENTS

2—electrochemical cell
  2A—electrochemical cell in charge mode
  2B, 2C—electrochemical cell in discharge mode
4—first half-cell
6—second half cell
8—PEM
10—uncharged storage particles
12—charged storage particles
14—water stream
16—oxygen stream
18—slurry of uncharged storage particles
20—slurry of charged storage particles
22—electrolyte
24—filter membrane
26—renewable energy source
28—uncharged storage particle source
30—uncharged storage particle storage
32A, 32B, 32C—slurry mixer
34A, 34B, 34C—slurry separator
36A, 36B, 360—electrolyte storage
38A, 38B—electricity users
40A, 403—transport shipping
41A, 41B—hydrogen gas storage
42—$H^+$ or $H_3O^+$ ions
43—storage cylinder for slurry of charged particles

DETAILED DESCRIPTION

In broad terms, the invention relates to a method of storing chemical energy, a method of generating electricity, storage particles resulting from such methods, and a system for performing such methods.

Although the present invention is described herein with reference to preferred embodiments, workers skilled in the art will recognize that changes may be made in form and detail without departing from the spirit and scope of the invention.

Proton Flow Reactor

According to an embodiment of the invention, there is provided a 'proton flow reactor', which operates electrochemically much like the proton battery disclosed in Heidari as described above. However, unlike the proton battery described in Heidari, in which the first half cell is configured to house a fixed carbon electrode, the first half cell of a proton flow reactor is configured to process an incoming slurry of storage particles. It has been surprisingly identified that use of a proton flow reactor offers many advantages and opportunities in terms of energy storage, transport and use of energy over existing energy storage and transport technologies, as well as that described in Heidari, A proton flow reactor generally comprises an electrochemical cell in which a PEM, such as a PEM comprising a Nafion™ layer, separates two half-cells. The first half-cell is configured to enable a slurry of storage particles suspended in an electrolyte to flow through the first half-cell, while the second half-cell is configured to enable either water (while in charge mode) or an oxygen-containing gas (while in discharge mode) to flow through the second half-cell. In certain embodiments operation of the proton flow reactor may be reversible, such that the same proton flow reactor that may operate in either a charge mode or a discharge mode. Operation of an exemplified proton flow reactor is now described.

The slurry of storage particles passing through the first half-cell effectively operates as a 'slurry electrode'. When compared with a porous fixed electrode, a slurry electrode may surprisingly allow for storage particles to act as the storage medium for hydrogen that can be progressively charged as the slurry flows slowly through the hydrogen-side half-cell of the electrochemical cell Hence the charged storage particles that emerge in the slurry from this half-cell can be separated from the liquid electrolyte, and then stored as dry particles in bulk in containers separate from the proton flow reactor. These dry charged storage particles are thus an energy-rich fuel that can be transported to locations distant from where they were charged, including as an export commodity in bulk sea tankers. By separating the device used to charge the particles (i.e. the electrochemical cell), from the bulk storage of charged storage particles, a much higher gravimetric and volumetric energy density of the storage system as a whole can be achieved.

Charge Mode

Figure 2:
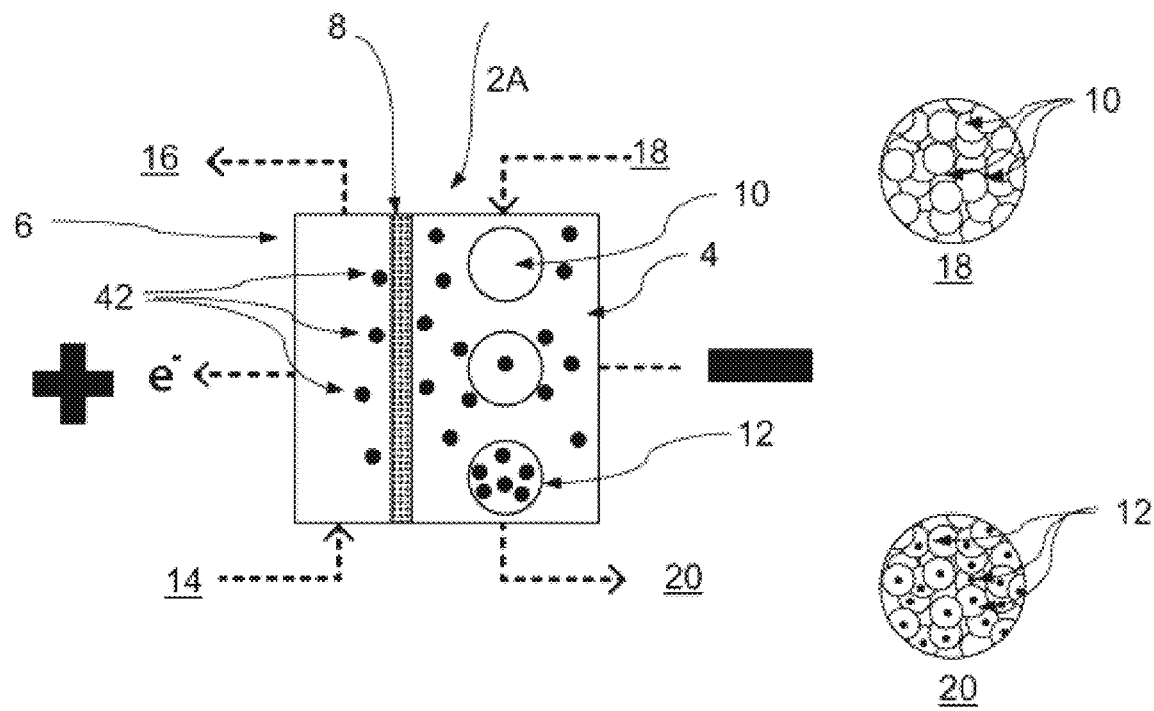
FIG. 2 shows a 'proton flow reactor' operating in charge mode—that is, electrolyser mode—according to an embodiment of the invention.

FIG. 2 shows an electrochemical cell 2A operating as a proton flow reactor in charge mode according to an embodiment of the invention. As shown, a slurry 18 of uncharged storage particles 10 flows slowly through first half-cell 4 (the hydrogen-side half-cell), where the uncharged storage particles 10 are negatively polarised either by an endplate, or by other suitable means such as mesh, foam or similar protruding into the slurry 18 to provide an electrical contact. At the same time, second half-cell 6 (the oxygen-side half-cell) is supplied with water 14 which is then split on applying electricity into oxygen 16 and $H^+$ or $H_3O^+$ ions 42. The $H^+$ or $H_3O^+$ ions 42 pass through the PEM 8 and into the first half-cell 4 to bond predominantly to the internal surfaces of negatively-polarised storage particles 10, thereby forming charged storage particles 12. Hydrogen is thereby effectively stored within the charged storage particles 12 for later use, In the embodiment shown uncharged storage particles 10 are progressively polarised and bonded to $H^+$ or $H_3O^{4\cdot}$ ions 42 as they flow continuously through the first half-cell 4 (i.e. in a continuous flow process). In other embodiments a repeatable batch-wise process may be implemented whereby a slurry 18 of uncharged storage particles 10 is firstly introduced to the first half-cell 4. The storage particles are then negatively polarised to attract and store $H^+$ or $H_3O^+$ ions 42 while held within the first half-cell 4, and the slurry 20 of charged storage particles 12 is thereafter removed from first half-cell 4.

To ensure that storage particles are sufficiently charged with hydrogen, the slurry may pass through a series of electrochemical cells 2. Each electrochemical cell 2 may be similarly configured, or otherwise configured to optimise a particular stage of charging the storage particles. Also, a recycle loop system may be implemented such that a portion of slurry and storage particles leaving an electrochemical cell are returned to that electrochemical cell for additional treatment.

Discharge Mode

Figure 3:
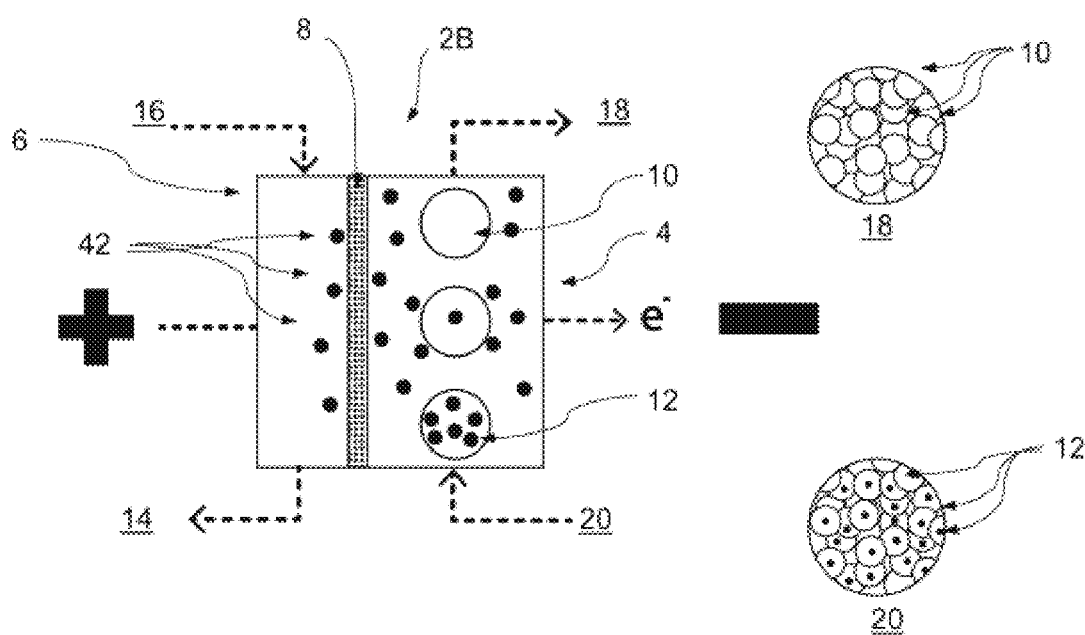
FIG. 3 shows a proton flow reactor operating in discharge mode—that is, fuel cell mode for electricity supply—according to an embodiment of the invention.

FIG. 3 shows electrochemical cell 2B operating in a discharge mode according to an embodiment of the invention. A slurry 20 of charged storage particles 12 flows slowly through first half-cell 4. At the same time air or another oxygen-containing gas 16 is supplied to second half-cell 6. $H^+$ or $H_3O^+$ ions 42 formed within the slurry pass through the PEM 8 and react with oxygen 16 in the second half-cell 6 to produce water and electricity. The reaction of hydrogen and oxygen in the second half-cell 6 drives the dehydrogenation of the charged carbon cells 12 in the first half-cell 2, and the flux of $H^+$ or $H_3O^+$ ions 42 through the PEM 8. In this way, hydrogen stored on the surface of the charged storage particles 12 can be used to fuel the redox reaction between oxygen and hydrogen resulting in water formation.

Like the charge mode described above, electrochemical cell 2B could operate in a continuous flow system or as a batch-wise system depending on operational requirements. Also like the charge mode, a system according to embodiments of the invention may comprise a series of electrochemical cells 2 in which storage particles are progressively discharged, and recycle loop systems may be separately or additionally implemented, again according to particular operational requirements.

Figure 4:
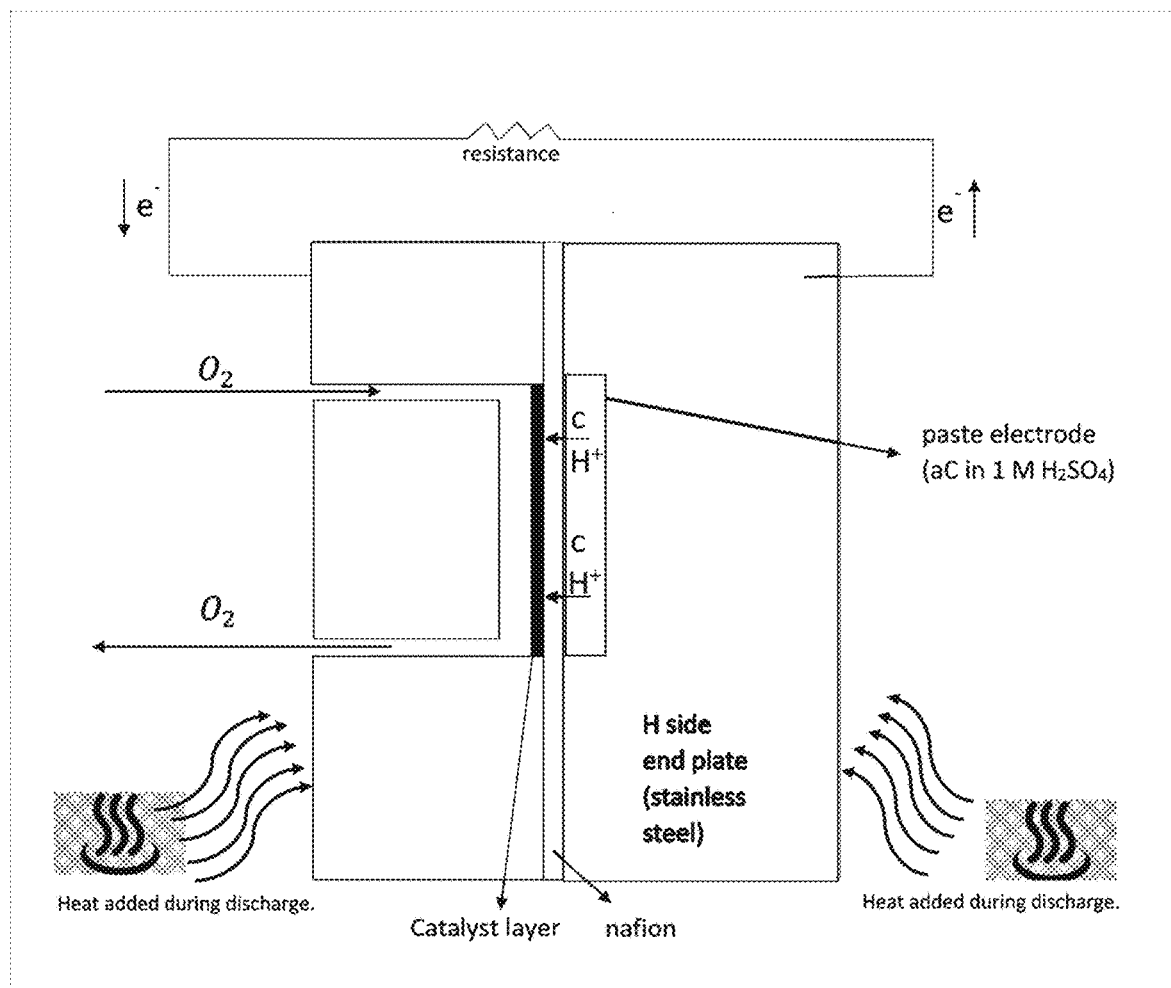
FIG. 4 shows a proton flow reactor operating with heating on the oxygen- and hydrogen-side electrodes, and no titanium GDL on the oxygen side, according to an embodiment of the invention.

According to an embodiment, the proton flow reactor cell can be moderately heated (such as to less than 100° C.) to improve discharge performance as exemplified in FIG. 4. Without wishing to be bound by theory, it is believed that moderate heating improves discharge performance by: (a) drying the catalyst layer on the oxygen side such that access of oxygen gas to the catalyst layer is improved, thereby significantly increasing the rate of water formation; (b) increasing the reaction rates for all electrochemical reactions due to increased temperature; and (c) locally increasing the electrolyte concentration, thus lowering the overpotential of ion transfer from the carbon particles to the Nafion™ membrane and then to the catalyst layer on the oxygen side.

According to an embodiment, heating may be combined with removal of the gas diffusion layer from the oxygen side, or replacing the gas diffusion layer with a much thinner layer, to enhance oxygen access to the catalyst. Without wishing to bound by theory, it is believed that the hydrogen extraction from a charged sample, and hence its effective reversible storage capacity (in wt % H), could be increased by potentially more than threefold by the combination of moderate heating and removal of the gas diffusion layer, or using a much thinner one.

According to an embodiment, heat may be supplied by incorporating electric heating cartridges, or installing similar heating systems, into the endplates of the proton flow reactor cell.

Figure 5:
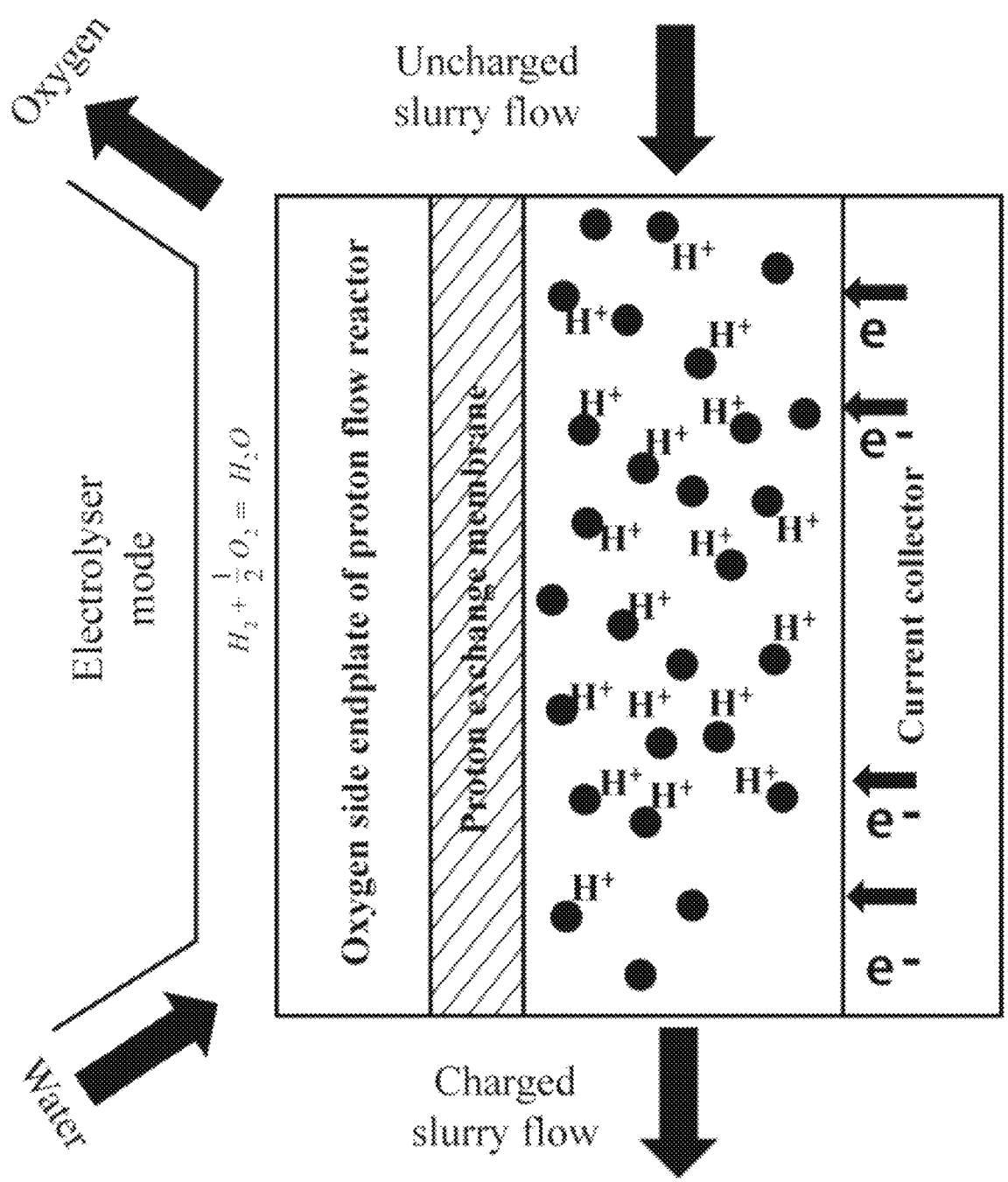
FIG. 5 shows a slurry electrode for a proton flow reactor incorporating a carbon foam current collector, according to an embodiment of the invention.
Figure 5:
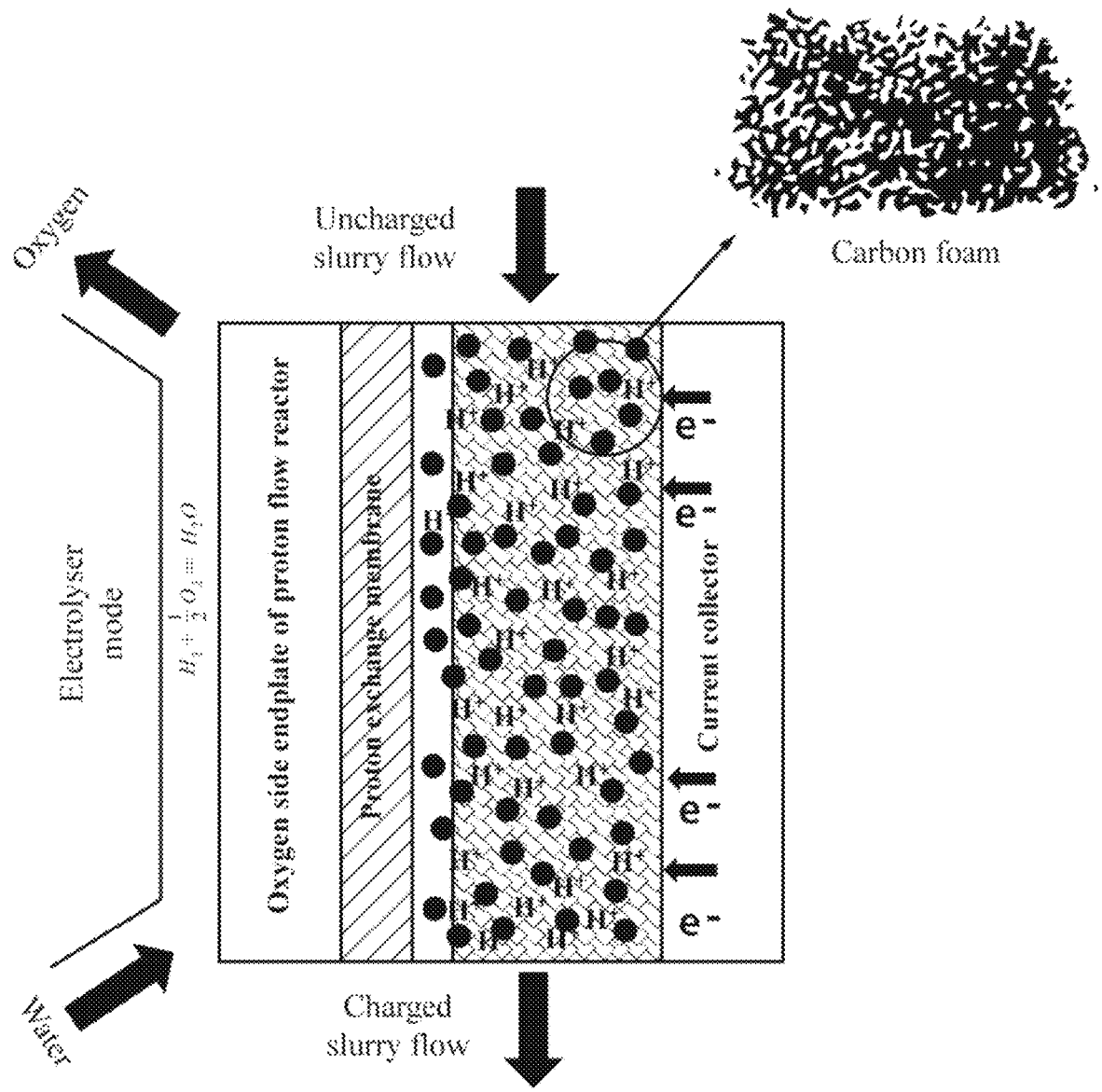

In an embodiment, proton flow reactors according to the invention may comprise a current collector comprising a carbon foam. FIG. 5 presents schematics of the conventional slurry electrode (a); and a slurry electrode incorporating a carbon foam current collector (b), Without wishing to be bound by theory, it is believed that incorporating a carbon foam current collector may greatly improve performance of the proton flow reactor by increasing the surface area of the current collector and facilitating charge transfer to the carbon particles in the slurry, while offering minimal flow resistance to the slurry flow. The slurry may flow through the 3D-connected porous network of the carbon foam so that carbon particles are surrounded by the carbon walls containing excess charge, a configuration that maximises particle-wall collision rates and thereby charge transfer.

Carbon foam has relatively high electron conductivity as well as a high internal surface area and sufficient mechanical strength to sustain the compression exerted by the end plates of the proton flow reactor cell. The 3D pore network of the carbon foam may also facilitate uniform distribution of liquid electrolyte within the current collector. Although carbon foam has a lower conductivity and hardness compared to stainless-steel metal foam, carbon is a much less effective catalyst for the hydrogen evolution reaction such that hydrogen gas evolution, which is undesirable according to certain embodiments, is discouraged.

Use of a carbon foam current collector may assist in overcoming one of the main drawbacks of slurry electrodes, being their relatively low electronic conductivity (less than the ionic conductivity of electrolytes) attributed to the discontinuous electron-transporting network formed by carbon particles. This low electron conductivity also results in the underutilisation of particles and the unavailability of charge for capacitive storage (Mourshed et al. 2021).

As an alternative discharge mode according to an embodiment of the invention, oxygen access to the catalyst layer on the oxygen side (cathode) of the proton flow reactor may be blocked by, for example: flooding it by water, filling it with other gases such as argon or nitrogen, or by applying vacuum. In this embodiment, the discharge reaction shifts from water formation to chemisorption of hydronium on available metals on the oxygen side. The amount of discharge is slightly decreased in this mode. If a small positive potential (for example, less than 0.5 V) is applied on the oxygen side, the cell is mildly heated, and/or the cell is kept at rest for a period, a hydrogen (gas) evolution reaction will commence, with hydrogen bubbles appearing on the oxygen side.

In this embodiment, charged powder can be discharged with simultaneous electricity generation, and evolution of hydrogen gas formed from the stored hydrogen atoms. The proton flow reactor system can thus be employed to produce high-purity hydrogen gas from the charged carbon powder, which can be used as a primary source of hydrogen gas in a refuelling system for hydrogen fuel cell transport vehicles.

The electricity generated during this alternative discharge mode can also have beneficial uses, including after short-term storage, possibly in a separate capacitor, to provide the small potential needed to enhance the rate of hydrogen gas evolution. Experiments conducted by the present inventors suggest that the energy required to enhance hydrogen evolution is significantly smaller than the energy generated during discharge of the cell. Hence a favourable positive energy balance may be achieved while producing high-purity hydrogen gas.

Storage Particles

The storage particles must provide a practical ability to store $H^+$ or $H_3O^+$ ions as part of an energy storage strategy. Ideally, the storage particles should provide;
- high reversible electrochemical hydrogen storage capacity, per unit mass and per unit volume;
- retention of hydrogen after drying;
- maintenance of a high roundtrip efficiency for hydrogen storage after multiple charge-discharge cycles.

Without wishing to be bound by theory, it is believed these characteristics may be obtained with the following desirable particle properties:
- high electrical conductivity (in form of electron conduction);
- the presence of surface functional groups that may provide enhanced opportunities for bonding to hydrogen, particularly oxygen and nitrogen;

high volume and surface area of ultramicropores, or layered domains with suitable interlayer spacing, that are likely to provide sites for bonding with hydrogen; and mesopores to provide channels for hydronium ion transport within the storage particle.

Where the particles constitute carbon particles, it is further desirable that there are significant regions of graphitic carbon on the inner surfaces of pores. As noted above, the term carbon particles is understood to mean particles predominantly formed of an electrically-conductive carbon-based material. Examples of electrically-conductive carbon-based materials include: activated carbon, graphene, graphene oxide, graphene functionalised or doped with nitrogen, graphitic carbon nitrides, graphene aerogel, carbon nanotubes. Other carbon-based materials may be utilised, particularly those that provide the above listed properties, Carbon particles need not for example be formed of pure carbon, but rather must provide a practical ability to bond or attach $H^+$ or $H_3O^+$ ions to the surface of the particles. A number of sources may be used to supply feedstock for carbon particle production, including biomass materials, black or brown coal. The electrochemical hydrogen storage capacity of activated carbons, and other forms of carbon such as Multi-Layer Graphene, may be enhanced by the presence of functional groups containing oxygen and nitrogen on the internal pore surfaces. Oxygen-based surface functionalities that may facilitate hydrogen storage include acidic groups such as carboxylic acid, lactones, phenols, lactol group, and basic groups such as quinone, pyrone, ketones and epoxides (Montes-Morán et al., 2004, Shafeeyan et al., 2010). Nitrogen-based surface funtionalities such as amide, imide, pyrrole, lactame and pyridine groups may also enhance hydrogen storage (Fels et al., 1995, Lahaye, 1998), Without wishing to be bound by theory, it is believed that these surface functionalities store hydrogen via reversible faradaic reactions in addition to double-layer capacitance.

In alternative embodiments, the storage particles may be formed of materials other than carbon, such as silicon, which may likewise provide for particularly desirable properties such as the previously listed:

high electrical conductivity (in form of electron conduction);

the presence of surface functional groups that may provide enhanced opportunities for bonding to hydrogen, particularly oxygen and nitrogen;

high volume and surface area of ultramicropores, or layered domains, to provide sites for bonding with hydrogen; and mesopores to provide channels for hydronium ion transport within the storage particles.

According to certain embodiments of the invention, the storage particle may possess one of more of the following characteristics:

high reversible electrochemical hydrogen storage capacity, per unit mass and per unit volume;

retention of hydrogen after drying;

maintenance of a high roundtrip efficiency for hydrogen storage after multiple charge-discharge cycles.

As noted above, earlier work has been previously performed to demonstrate that $H^+$ or $H_3O^+$ ions can be electrochemically neutralised and hydrogen stored within porous activated carbon electrodes, i.e. carbon electrodes that are stationary and remain within the electrochemical cell (Jurewicz et al., 2001, Jurewicz et al., 2002, Vix-Guterl et al., 2005, Fang et al., 2006, Bleda-Martinez et al., 2008, Jurewicz and Babel, 2008, Yang et al., 2010). In respect of these porous activated carbon electrodes, promising gravimetric energy densities of up to 2.2 wt % hydrogen have been reported (Jurewicz, 2009), superior to the best currently available metal hydrides (−1.6 wt %).

According to certain embodiments, the carbon particles may be provided as particles of activated carbon. Such particles may be formed from various feedstocks including phenolic resin and brown coal. In an embodiment, carbon particles may comprise activated carbon made from phenolic resin activated with a ratio of 1:7 potassium hydroxide. Such methods of production allow for high BET surface areas and a wide range of pore sizes right down to below 0.7 nm.

In addition to activated carbon:

graphene hydrogels with tuneable interlayer spacing (Cheng and Li, 2013); other graphene-based materials, such as graphene oxide derivatives terminated by hydroxyl and epoxy-hydroxyl groups (Gupta et al., 2017);

activated carbon modified by electroactive anthraquinone (Pognon et al., 2011a) (Pognon et al., 2011b) or quinone (Isikli et al., 2014); or by oxidation with 5% $O_2$ in Ar (Figueiredo et al., 1999), $HNO_3$(Nevskaia and Martin-Aranda, 2003), or $H_2O_2$/steam (Heo and Park, 2018); and stacked monolayer carbon nitride materials (Tan et al., 2015), may form suitable materials to provide carbon particles.

Referring to graphene, the maximum gravimetric density reachable with chemisorption is 8.3% (=$^1\!/_{12}$), well above the 5.7 wt % in Toyota's 700 bar advanced composite compressed hydrogen gas storage cylinders (Toyota, 2016) (Toyota, 2017). This corresponds to the formation of a completely saturated graphene sheet, namely "graphane". The stability of the latter has been hypothesised in a DFT-based theoretical study (Sofa et al., 2007) and subsequently studied in experiments (Elias et al., 2009).

Synthetic graphitic carbon nitrides have shown particular promise for use as the proton storage electrode in a proton battery, and in turn for use in a slurry in a proton flow reactor. For example, g-$C_3N_4$ is a semiconductor, and g-$C_4N_3$, is the most stable allotrope at ambient temperature and pressure shows semi-metallic properties (Du et al., 2012). Both of these 2D structures have regular holes in their surfaces so that in a multi-layered material hydrogen transport can occur through these holes in addition to between the layers, thus potentially enhancing the rates of charging and discharging. In addition, the nitrogen atoms in the structure have lone-pair orbitals that have high electron density, and could thus particularly attract positively-charged hydronium and formation of N—H bonds. (Tan et al., 2015) has recently demonstrated through density functional theory simulation that electrical charging of nanosheets of g-$C_4N_3$ and g-$C_3N_4$ offers a promising technique for high-capacity and electrically-switchable hydrogen storage.

According to certain embodiments, the carbon particles may be of smaller size, thereby providing high surface area to volume ratios while also ensuring ease of processing when found in a slurry. According to certain embodiments, the storage particles may have a diameter of approximately 0.5-1 microns to ensure that Brownian motion maintains them in suspension within a slurry. However, in other embodiments larger or smaller storage particle may be used. Other suitable particle sizes include: 0.1-5 microns, however the invention is not broadly considered limited to any particular particle size so long as a transportable slurry can be formed. Methods such as milling (for example, ball milling) can be used reduce the size of the storage particles.

According to certain embodiments the storage particles may provide high porosity, which provides high surface area to volume ratios with which to bond or attach hydrogen. Suitable porosity levels may optionally be in the range of 20% to 40%.

Electrolyte

Suitable electrolytes for use within slurries according to embodiments of the invention would generally include any electrolyte capable of conducting $H^+$ or $H_3O^+$ ions. Suitable electrolytes include:
- dilute sulphuric acid (for example between 1 M to 4 M);
- protic ionic liquids, including pure diethylmethylammonium triflate (DEMATf);
- 10 mol % DMATf in water; triflic acid (HOTf):$H_2O$ mol % DEMATf
- dilute nitric acid;
- organic acids such as acetic acid, or formic acid; and
- redox-active electrolytes (Roldán et al., 2011b, Roldán et al., 2011a) (Roldan et al., 2011c)

When selecting suitable electrolytes, one may balance competing considerations such as the ability of the proposed electrolyte to conduct $H^+$ or $H_3O^+$ ions versus the likelihood that the electrolyte could cause or facilitate adverse reactions in respect of the storage particles. Ideally, the selected electrolyte should provide: high protonic conductivity; low electronic conductivity; proton carrying ions being suitably sized to transport into porous storage particles; low reactivity with the storage particles; and low reactivity with components of the electrochemical cell (e.g. a Nafion PEM).

Slurry Mixing

In certain embodiments a slurry of uncharged storage particles (or charged storage particles) pre-mixed with electrolyte may be supplied into the first half-cell. Similarly, in certain embodiments storage particles (or charged storage particles) may be removed from the first half-cell together with the electrolyte as a slurry. In alternative embodiments the electrolyte and the storage particles may be delivered separately to supply the slurry to the first cell half-cell, and the electrolyte and the particles may be removed separately to remove the slurry from the half-cell.

A suitable slurry may be formed simply by mixing storage particles or charged storage particles (as the case may be) with electrolyte. Standard methods of mixing may be implemented as understood in the art. In certain embodiments the storage particles may (on a weight of particles/weight of liquid basis) comprise between 5-35% (w/w), optionally 5-15% (w/w) for traditional slurries, while 15-35% may be utilised for thicker paste-like slurries.

The consistency of the slurry used in the slurry electrode can vary from a relatively viscous liquid to a thick paste. A viscous liquid has the advantage of facile flow through the hydrogen-side half-cell of the electrochemical cell, with low parasitic pumping power and energy required. But it has the disadvantages of low electrical conductivity, ohmic resistive energy losses, and a slower and possibly less complete charging of the storage particles with hydrogen. A paste has the advantages of high electrical conductivity, low resistive energy losses, and faster and more complete particle charging, but has the disadvantages of requiring higher pumping power and associated greater parasitic energy consumption, and difficulties associated with paste sticking in crevices in the electrode structure.

Slurry Separation

According to certain embodiments, the storage particles may be separated from the electrolyte following removal from the electrochemical cell. This for example allows the storage particles to be transported and stored. The electrolyte may likewise be stored for re-use, such as for making a fresh slurry containing storage particles at a later time.

Suitable separation techniques may depend on the properties of the slurry and storage particles. A relevant consideration is the ability of the separation technique utilised to separate electrolyte without negatively affecting the extent of hydrogen bonding/attachment to the surface of the charged storage particles. It may include: blowing an inert gas through the storage particles, filtration, settling (involving flocculation or agglomeration where suitable), hydrocyclones and the like. The size of the storage particles may affect separation technique selection. If the storage particles are for example below 3 microns, then certain existing techniques such as use hydrocyclonic separation may be less suitable.

In an embodiment, the separation technique may comprise blowing/evaporating the liquid out of the slurry and storage particles by exposure to an inert gas under pressure. The storage particles may be heated up in a controlled environment to facilitate the evaporation process.

Figure 6:
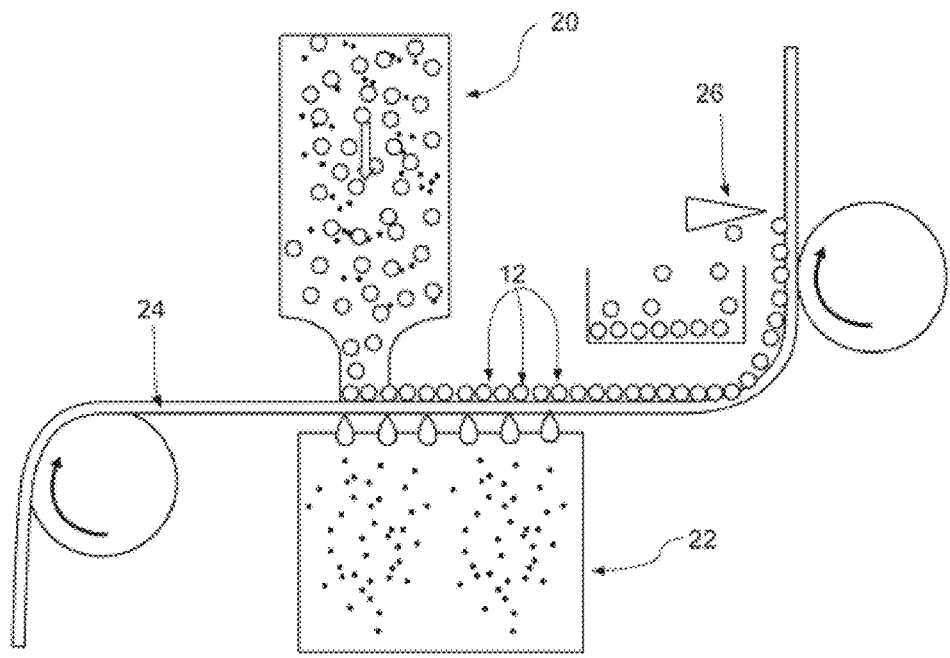
FIG. 6 shows one embodiment of a continuous system for separating the solid storage particles from the liquid electrolyte.

In an embodiment, the separation technique may comprise filtration using a moving membrane dead-end filter 24 as exemplified in FIG. 6. In use charged storage particles 12 may deposit on the surface of the moving membrane 24 while liquid electrolyte 22 passes there-through. The charged storage particles 12 may then be removed from the membrane 24 by for example physical means such as a knife 26, or by vibration. Alternatively, the charged storage particles 12 may be stored long-term on the membrane 24, in which case the charged storage particles 12 may be removed from the membrane 24 by flowing electrolyte 22 in the reverse direction through the membrane 24 to form a slurry for use. The same or corresponding apparatus may be similarly used to remove uncharged storage particles from a slurry.

According to certain embodiments, the separated storage particles may be further dried after separation from the slurry by filtration or other methods. This may be achieved by blowing an inert gas through the storage particles, for example.

In alternative embodiments, such as where charged storage particles are stored locally and not transported to an alternative location after production, the charged storage particles may be stored with electrolyte in the output slurry until required to generate electricity. Such an arrangement may be suitable for, as an example, domestic storage of energy produced using solar cells, in which energy produced during daylight hours may be stored for usage at night.

Storage Particle Storage and Shipping

According to certain embodiments, storage particles may be transported and stored in large containers until such time as needed, e.g. for use in producing electricity.

Existing technologies may be utilised to store storage particles. For example, a suitable storage device for storage of carbon particles should preferably account for:

storage of a potentially micron-sized fine solid carbon-based powder in very large quantity the relatively low density of storage particles;

flammability; and the ability of charged storage particles to 'self-discharge' in oxidising atmospheres—to manage this issue, the charged storage particles may potentially be stored within an inert nitrogen atmosphere.

the ability to withstand any physical impacts, or extreme atmospheric temperatures, without release of particles to the atmosphere.

Given the potential uptake of the present invention, new designs for storage may be developed for cost-effective storage of vast amounts of material—i.e. many tonnes of flammable material. Such new designs may build on experience from bulk handling of powdered materials such as cement, fertiliser or bulk grain.

Energy Generation and Storage System

Figure 7:
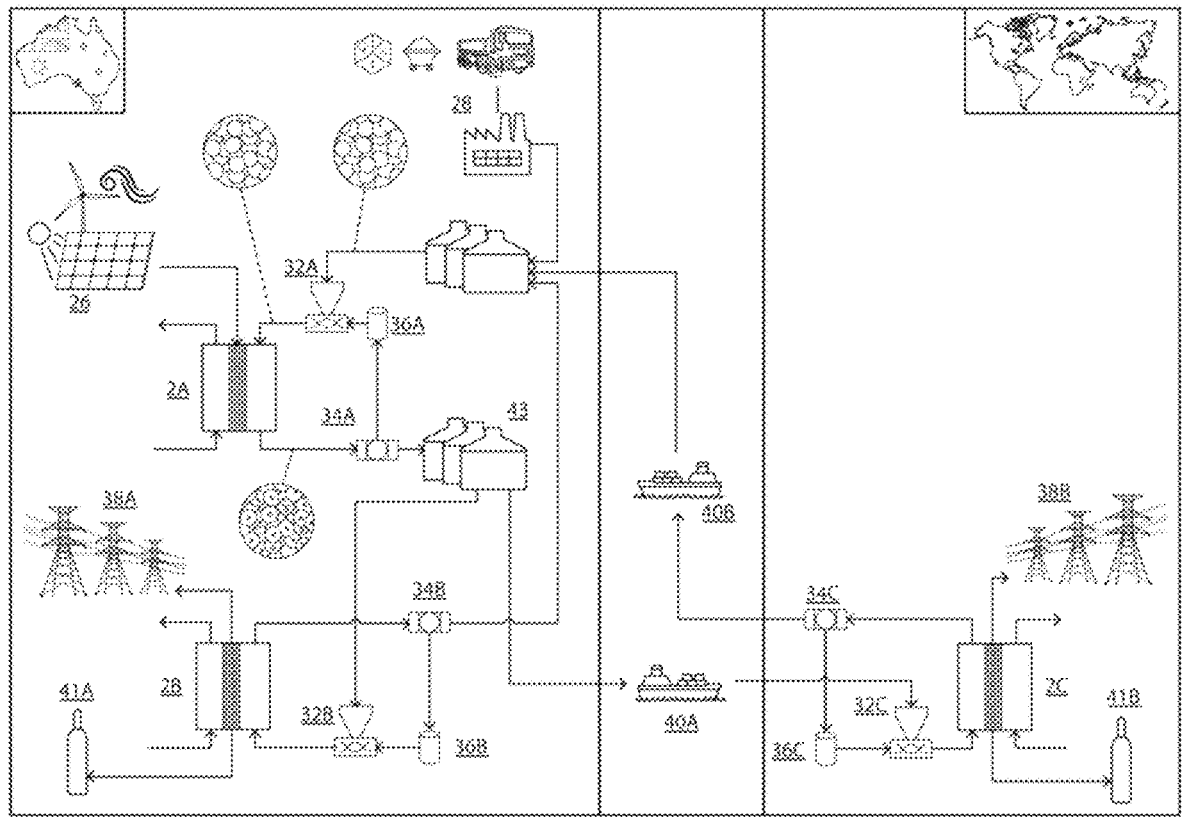
FIG. 7 shows a domestic and international energy storage and transport system according to an embodiment of the invention.

According to certain embodiments, methods and apparatuses of the invention can be used as part of a broader energy generation and storage system, such as the renewable energy storage and generation system set out in FIG. 7.

In FIG. 7 uncharged storage particles are obtained from any of a number of potential sources, including renewable or non-renewable, inorganic or organic, sources 28. The uncharged storage particles are then stored in an uncharged storage particle store 30. Prior to charging, the uncharged storage particles are mixed with electrolyte in mixer 32A before being supplied to electrochemical cell (i.e. 'proton flow reactor') 2A, configured for charge mode. The electrochemical cell 2A is powered by a renewable energy source 26, which provides electricity to electrolyse water into oxygen and $H^+$ or $H_3O^+$ ions and produce charged storage particles. A slurry comprising charged storage particles is then sent to separator 34A where electrolyte is separated and recycled to electrolyte storage 36A. The dried charged storage particles are then sent to charged storage particle storage 43 for later use.

FIG. 7 provides alternative uses for charged storage particles, in which charged storage particles are used to generate electricity domestically and internationally. In domestic use the charged storage particles are sent to mixer 32B where they are mixed with electrolyte from electrolyte storage 36B. A slurry of charged storage particles is then sent though proton flow reactor 2B, in which hydrogen reacts with oxygen to form water and electricity for electricity users 38A. As a result of this process the charged storage particles are depleted of their hydrogen, forming uncharged storage particles which are separated from the slurry in separator 343 and returned to uncharged storage particle storage 30. Such a system may provide a means of storage of surplus electricity from inherently-intermittent or variable renewable sources (e.g. solar and wind resources) on main, regional or community-scale electricity grids, and thus assist in meeting national greenhouse gas reduction targets.

In international use the process is similar in that charged storage particles are sent to mixer 32C where they are mixed with electrolyte from electrolyte storage 36C. A slurry of charged storage particles is then sent though electrochemical cell (i.e. 'proton flow reactor') 2C, in which hydrogen reacts with oxygen to form water and electricity for electricity users 388. Uncharged storage particles are separated from the slurry in separator 34C and returned to uncharged storage particle storage 30. The main difference is that charged storage particles can be sent overseas via shipping 40A and returned as uncharged storage particles via shipping 403. Such a system may provide a zero-emission source of electricity for countries lacking sufficient renewable energy sources of their own, by importing the charged carbon material from other countries with surplus renewable-energy capacity. This form of exchange will assist in reducing greenhouse emissions and tackling climate change globally.

Application of the technology to a broader energy generation and storage system demonstrates the increased flexibility that may be provided by certain embodiments of the present invention. That is, use of storage particles to bond or attach $H^+$ or $H_3O^+$ ions allows for flexible storage and transport of chemical energy since the storage particles can be removed from a proton flow reactor, transported and stored as a bulk product. A fixed porous electrode technology, such as that disclosed in Heidari, cannot be easily removed from the proton battery without disassembling the electrochemical cell. In this way the proton battery of Heidari effectively acts as a rechargeable battery incorporating a rechargeable but internally stored source of fuel, instead of a fuel cell utilising an external source of fuel/energy storage.

According to an embodiment, another application for the hydrogenated carbon particles is illustrated in FIG. 7 (components 41A in domestic context, and 418 in international context) in which hydrogen gas can be directly extracted from a proton flow reactor system while electricity is generated during discharge of carbon particles. Hydrogen gas may be used for fuel cell vehicles, whether electrically-powered cars and trucks, ships, aircraft, or fork lifts. This application mode therefore allows the proton flow reactor system to be used for exporting hydrogen in the form of hydrogenated carbon particles produced from abundant renewable energy in one country, and generating hydrogen gas directly for transport applications in the importing country, while also generating electricity.

It is believed that storage of hydrogen with storage particles may provide advantages over existing hydrogen storage methods. Considering for example the storage of hydrogen as a pressurised gas or as a cryogenic liquid, these methods require a large amount of energy to bring the hydrogen into a condition for storage. Compared to existing technologies, it is believed that storage of hydrogen on particles could potentially allow for:

competitive and practical gravimetric and volumetric energy densities obtained at near ambient temperature and pressure conditions improved safety in which hydrogen is stored as a solid-state non-explosive material.

lower, or at least similar, ratio of total energy input per unit of electrical energy delivered and supplied; and the ability to rely on relatively abundant material (e.g. carbon particles) as a storage mechanism for hydrogen.

It is believed that the present invention, and the concept of the proton flow reactor, allows for extending the proton battery concept to large-scale storage of hydrogen as needed for electrical energy storage of intermittent solar and wind energy input on main electricity grids. Additionally, it is believed that the present invention may allow for the production of a hydrogen-based fuel from zero-emission renewable energy sources that is suitable for export in bulk.

Experimental

The present inventors conducted experimental work to confirm the technical feasibility of applying an electrochemical process to store hydrogen within porous carbon particles. According to the experiment a paste of carbon particles in a liquid acidic electrolyte was supplied to an electrochemical cell with the same configuration as that of FIG. 1. That is, an electrode of particulate paste replaced the fixed porous electrode within the proton reactor of FIG. 1. It is noted that a particulate paste is a limiting case of a particulate slurry incorporating a near-maximum density of particles. The experiment was conducted in a batch mode, in which the paste was held stationary in the first half-cell while the carbon particles were charged.

Figure 8:
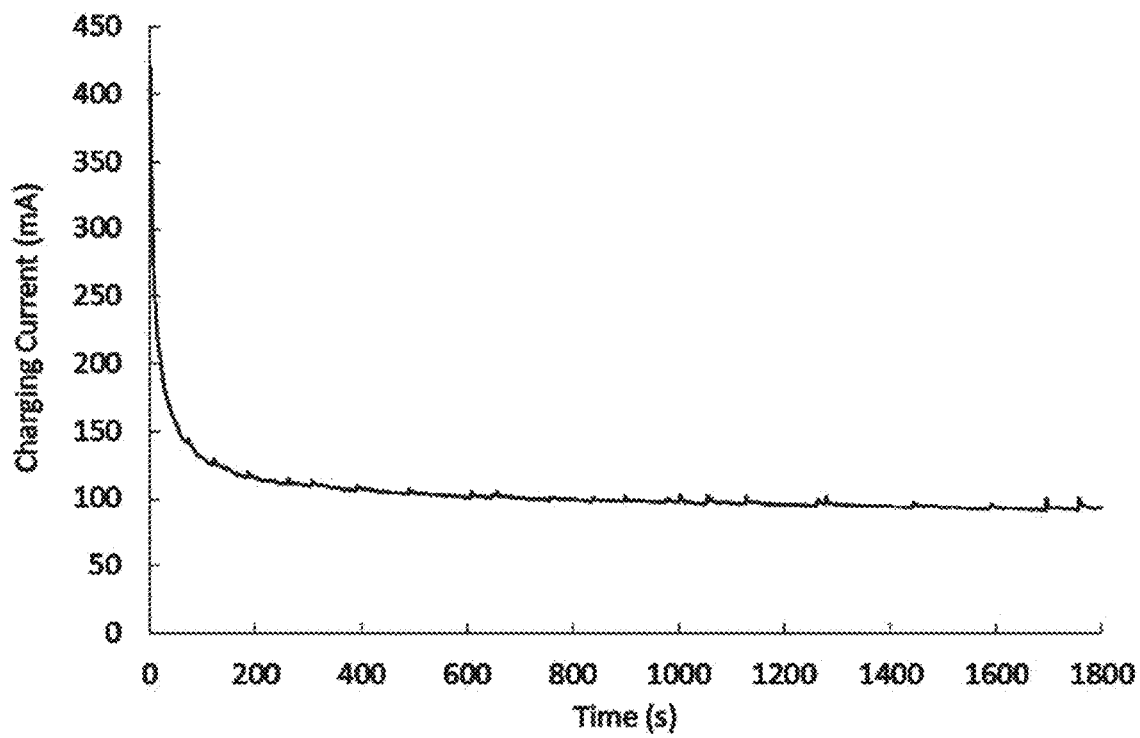
FIGS. 8-11 show results of an experiment demonstrating viability of a paste electrode made from activated carbon from phenolic resin and 1 M sulphuric acid as the electrolyte, as a limiting case of a slurry electrode, according to an embodiment of the invention.

The experiment was otherwise performed as follows:
the paste electrode was prepared by mixing 24 mg of carbon powder (activated carbon from phenolic resin activated with 1:7 KOH) with an electrolyte of sulphuric acid (1 M) at an approximate mass ratio of 1:4. The paste was placed on the carbon felt in the first half-cell and the whole electrochemical cell was assembled;
the electrochemical cell was charged for 30 min at a potential of 1.8 V. The charging condition was continued for longer than necessary to ensure the paste was fully charged with hydrogen. The charging current versus time profile for the first cycle at the potential of 1.8 V over 30 minutes is shown in FIG. 8
discharging was then carried out straight away at successively lower currents of 5 mA, 2 mA, 1 mA, and 0.5 mA, respectively, with a five-minute rest between each step. From the total charge that flowed, the maximum hydrogen stored in the paste under the condition of minimal self-discharge was calculated.

Figure 9:
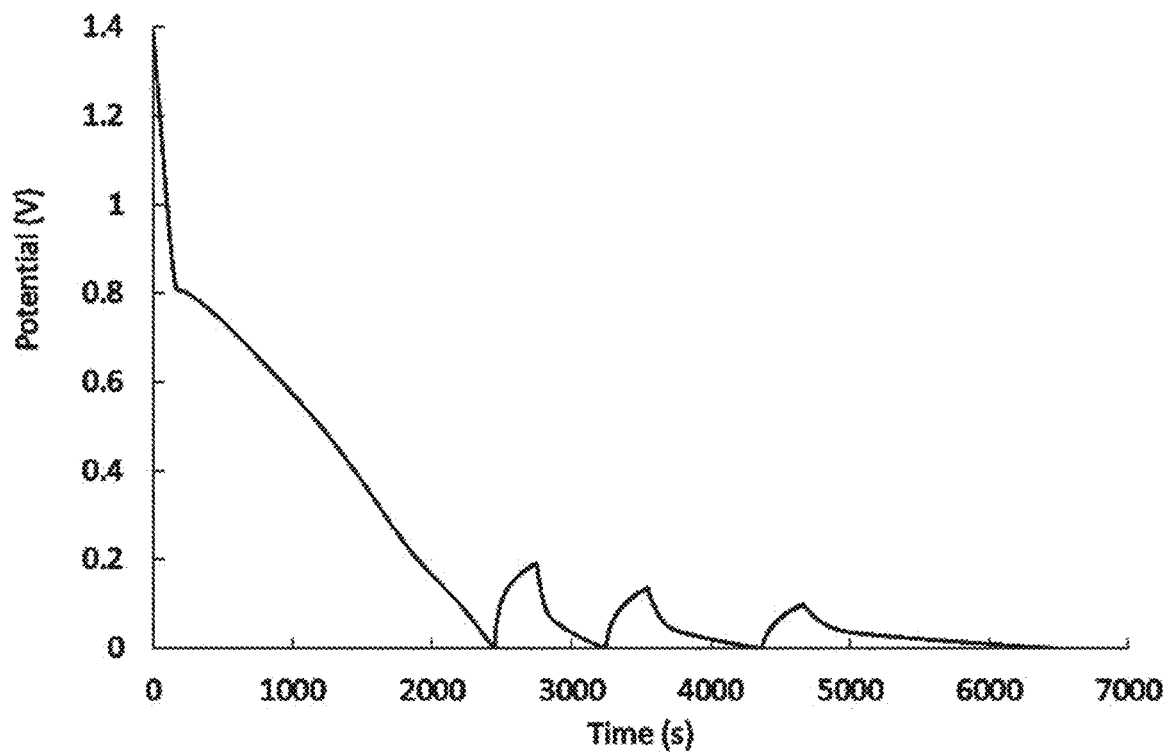
Figure 10:
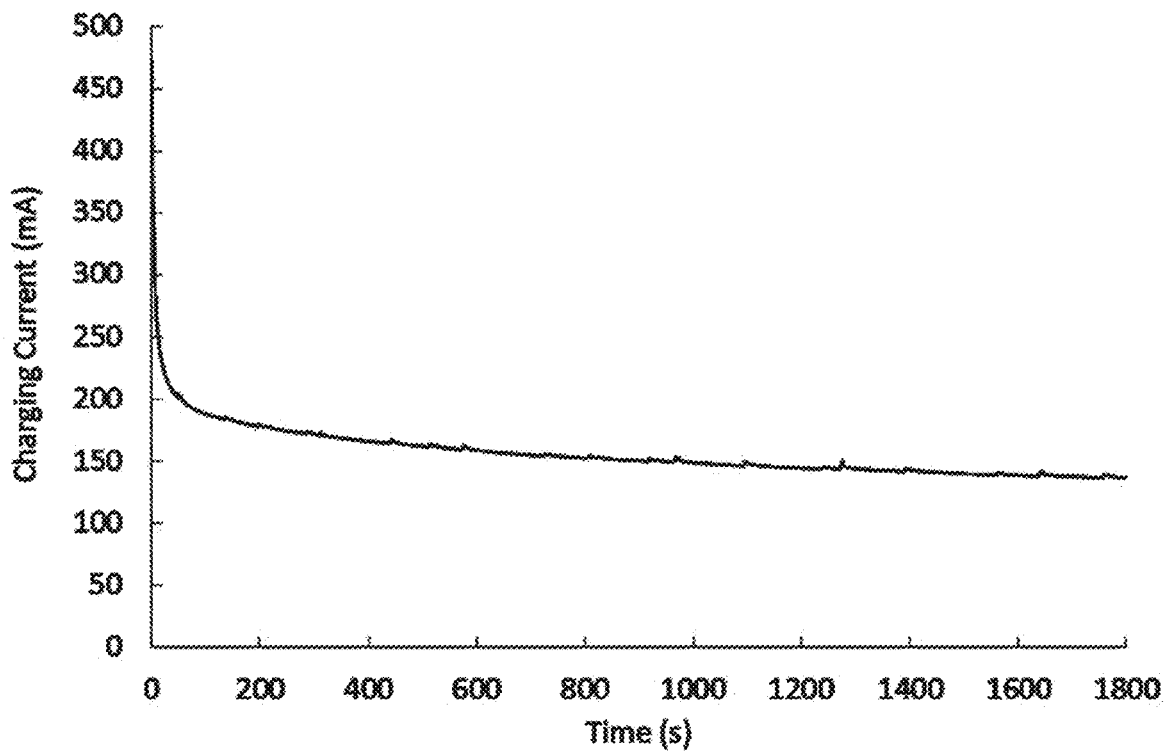

The potential variation during discharge at the four stepped currents and 5-minute rest period between each discharge step is shown in FIG. 9. From FIG. 9 it was calculated that 14.97 C charge flowed during discharge, which was equivalent to 0.65 wt % hydrogen storage in the electrode. This level of charging was lower than otherwise expected, which was later found to be due to an iron contaminant. Nevertheless, the ability to store energy within a paste of carbon powder was demonstrated. In another experiment on a similar sample with the mass of 11 mg, by employing similar charging and discharging processes except that the cell was heated during discharge, 23.62 C was discharged, which was equivalent to 2.23 wt % hydrogen storage, The procedure described in [0133], [0134] and [0135] with no heating during discharge was thereafter repeated in a second cycle with the additional step of drying and rewetting the paste electrode with electrolyte to demonstrate that charged carbon particles may be retained after drying. Drying and rewetting of the paste electrolyte involved:
removing the liquid acid electrolyte in this electrode by blowing through with argon gas for 30 min;
allowing the charged carbon particles after drying to remain in situ as a powder in argon environment for 16 h;
adding liquid acid once again to reconstitute the paste electrode For the second cycle, the cell was recharged at a potential of 1.8 V for 30 min, as shown in FIG. 10.

Figure 11:
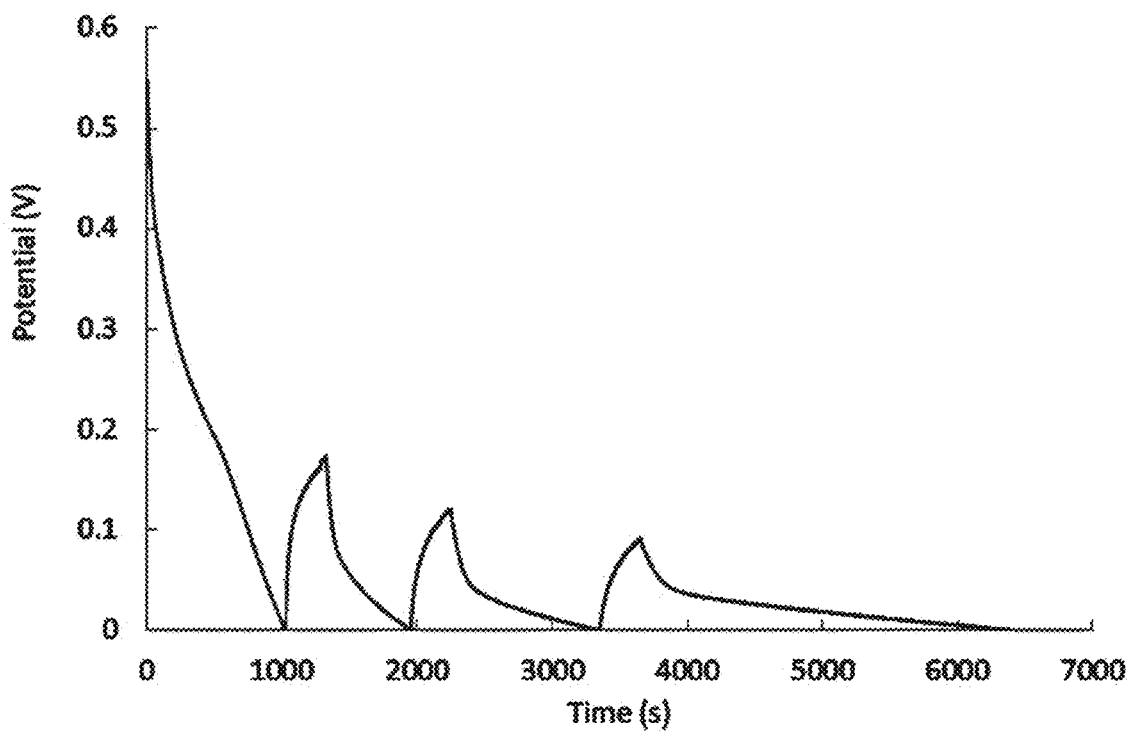

After the liquid acid removal and drying procedure described under Method, liquid acid was again connected to the hydrogen side and the electrode was discharged with declining stepwise currents as in cycle 1, as shown in FIG. 11.

It was calculated from FIG. 11 that 8.85 C charge flowed during discharge in the second cycle, which was equivalent to 0.38 wt % hydrogen storage in the electrode. This result demonstrated that more than half of the hydrogen stored in the electrode immediately after charging remained stored after the drying and rewetting process.

At the end of the experiment, the following procedure was used to observe the likely state of the paste electrode after the acid removal process:
the hydrogen side of the cell was disconnected from the acid source and the electrode inside dried by blowing argon gas through for 30 min; and
the cell was then disassembled, and the electrode observed directly in its dried state;

After drying the paste electrode returned to a powder state. Since the first and second drying processes were identical, the state of the electrode at the time of disassembling the battery and at the start of second discharge were assumed to be identical.

To those skilled in the art to which the invention relates, many changes in construction and widely differing embodiments and applications of the present invention will suggest themselves without departing from the scope of the present invention as defined in the appended claims. The disclosures and the descriptions herein are purely illustrative and are not intended to be in any sense limiting, Where specific integers are mentioned herein, which have known equivalents in the art to which this invention relates; such known equivalents are deemed to be incorporated herein as if individually set forth.

Figure 12:
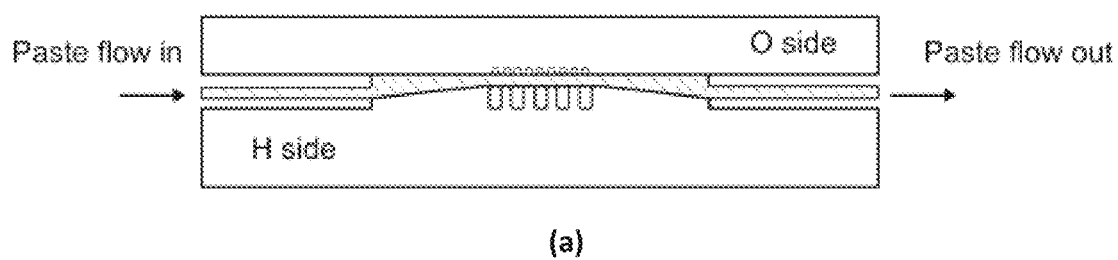
FIG. 12 shows (top) a schematic drawing of a vertical section through a flow-in flow-out paste proton flow reactor according to an embodiment of the invention; and (below) a 3D drawing of the same reactor showing the H-side end plate, the channel through which the paste flows into and out of the reactor, and the rectangular active area of the cell.
Figure 12:
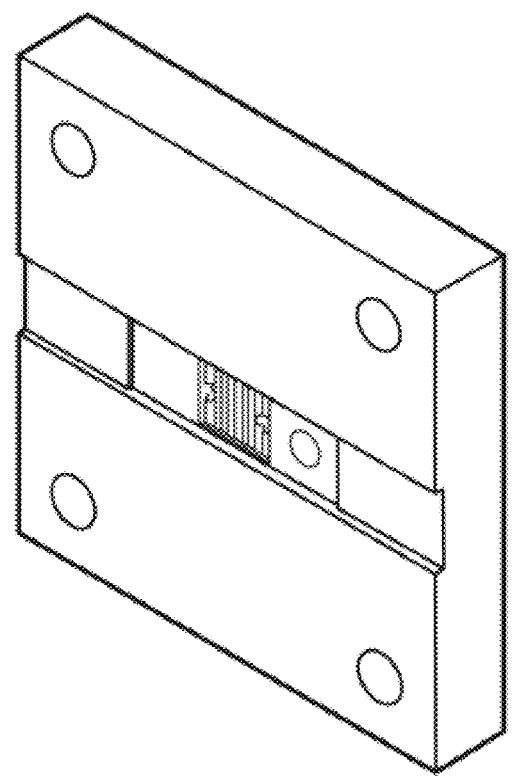

The inventors developed a small-scale embodiment of the proton flow reactor as shown in FIG. 12 (top—cross-sectional schematic view; bottom—3D drawing showing the channel for the paste in the hydrogen side of the cell). The reactor was loaded with a paste comprising 25 wt % carbon particles and 75 wt % 1 M sulphuric acid, and operated in charge mode at a potential of 1.85 V to store hydrogen within pores of the carbon particles. The charged carbon paste was then moved to another location inside the reactor such that the paste was not in contact with the charging electrodes and end plates. The charged paste was kept in this location for an hour. The charged paste was then returned to the charging location in contact with the electrodes and end plates and discharged by applying successive currents of 5 mA (0.36 A/g), 2 Ma (0.14 A/g), 1 mA (0.072 A/g), and 0.5 mA (0.036 A/g), The overall discharge was calculated t to determine a hydrogen storage weight percentage. Using this demonstration setup, the proton flow reactor was shown as successfully storing 75% of the charged hydrogen over the specified period.

Figure 13:
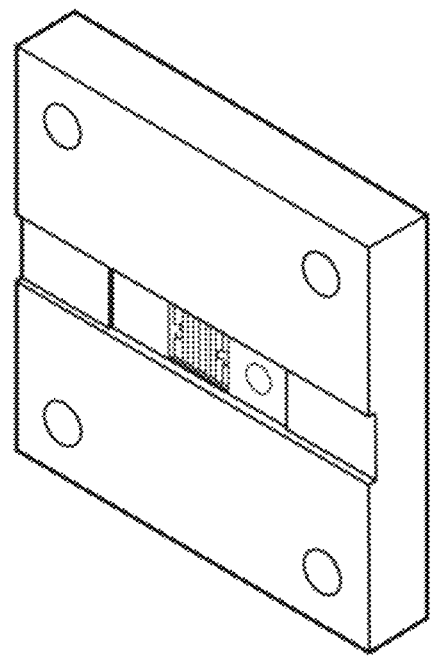
FIG. 13 shows a microfluidic proton flow reactor according to an embodiment of the invention, including (a) a schematic side view of the proton flow reactor; (b) a photograph of the same reactor; and (c) photograph of the same reactor in charge mode demonstrating oxygen bubbles on the oxygen side of the cell.
Figure 13:
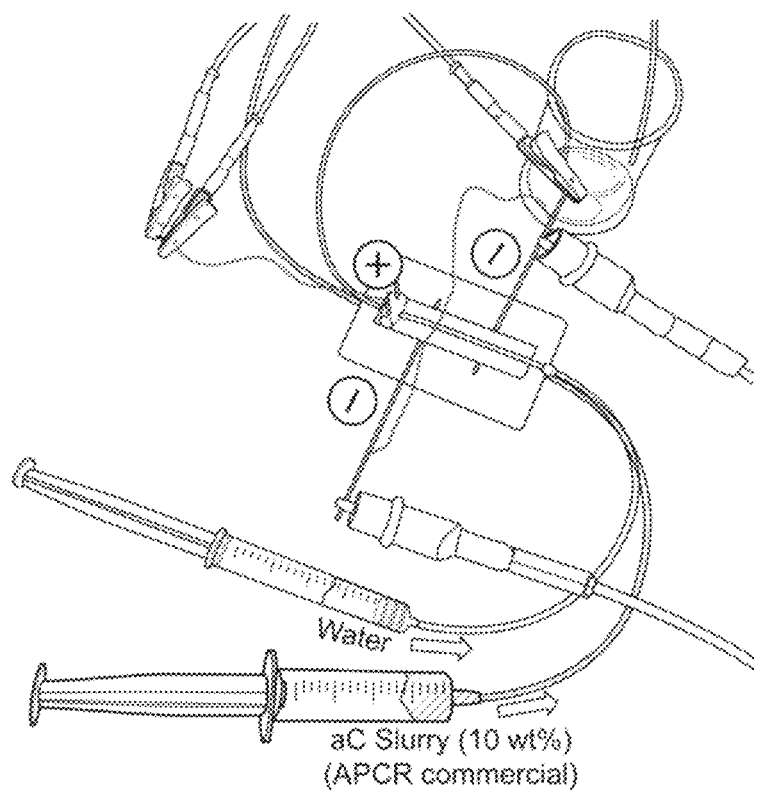
Figure 13:
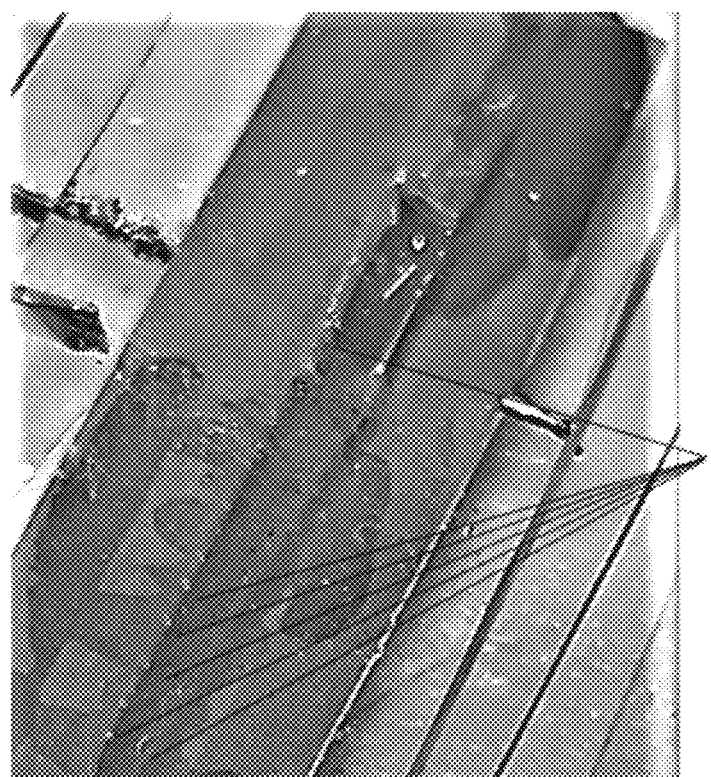
Figure 14:
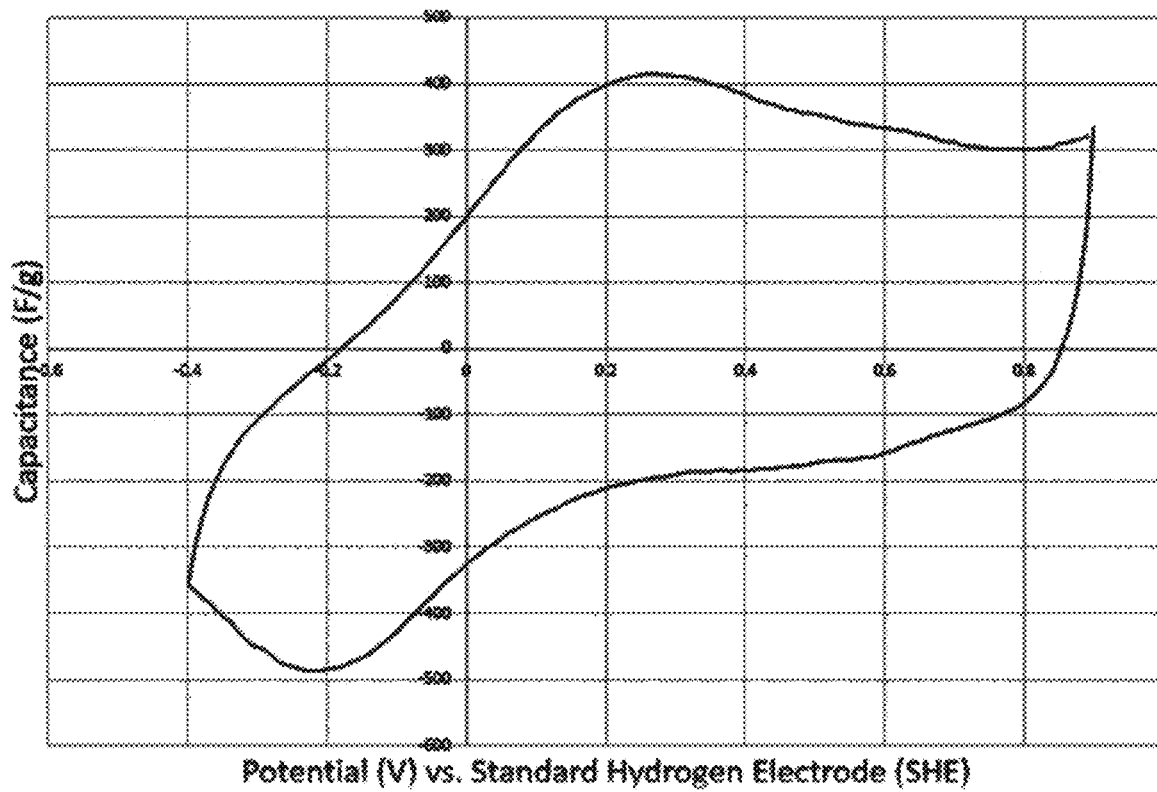
FIG. 14 shows a cyclic voltammogram of an activated carbon from phenolic resin sample in a 1 M dilute sulphuric acid electrolyte taken with a three-electrode cell at a scan rate of 2 mV/s over the potential range −0.4 to +0.9 V versus a Standard Hydrogen Electrode.

The inventors also developed a microfluidic proton flow reactor, according to an embodiment of the invention and as shown in FIG. 13, and measured its performance in charge and discharge modes, The carbon slurry electrode was prepared by adding 0.25 g activated carbon from phenolic resin in 1.00 g of 1 M sulphuric acid solution. The slurry was injected into the microfluidic device using a syringe, Distilled water was simultaneously injected into the PDMS channel towards the oxygen side, and the slurry electrode was partially charged by applying 2.0 V. During this experiment the slurry was kept stationary while charging. It was found that the slurry was able to be discharged at a current of at least 0.5 mA. The same microfluidic proton flow reactor may similarly be used for charging and discharging a flowing slurry.

The inventors obtained evidence of the C . . . H bonding required in C-particles in the proton flow reactor system by conducting cyclic voltammetry on a sample of activated carbon from phenolic resin in a 1 M $H_2SO_4$ electrolyte within a potential range of −0.4 to 0.9 V versus Standard Hydrogen Electrode.

The second-cycle cyclic voltammetry curve is presented in FIG. 1. The non-rectangular shape of the curve with peaks indicates the presence of chemical reactions above pure electric double layer capacitance. The strong cathodic and anodic peaks at potentials of −0.2 V and 0.25 V indicate electrochemical reactions involving C . . . H bonding, Additionally, evidence of weak cathodic and anodic reactions at potentials of 0.4 V and 0.6 V may be put down to electrochemical reactions of hydrogen with oxygen (such as the quinone and hydroquinone pair) and nitrogen surface functionalities (Kun Yang et al., 2013).

REFERENCES

The entire disclosures of each of the following references are hereby incorporated in full, BABEL, K. & JUREWICZ, K. 2008. KOH activated lignin based nanostructured carbon exhibiting high hydrogen electrosorption, Carbon, 46, 1948-1956.

BLEDA-MARTÍNEZ, M. J., PÉREZ, J., LINARES-SOLANO, A., MORALLÓN, E. & CAZORLA-AMORÓS, D. 2008. Effect of surface chemistry on electrochemical storage of hydrogen in porous carbon materials. Carbon, 46, 1053-1059.

CHENG, C. & LI, D. 2013. Solvated graphenes: an emerging class of functional soft materials. Adv Mater, 25, 13-30.

DU, A., SANVITO, S. & SMITH, S. C. 2012. First-principles prediction of metal-free magnetism and intrinsic half-metallicity in graphitic carbon nitride, Physical Review Letters, 108.

ELIAS, D. C., NAIR, R. Ft, MOHIUDDIN, T. M. G., MOROZOV, S. V., BLAKE, P., HALSALL, M, P., FERRARI, A. C., BOUKHVALOV, D. W., KATSNELSON, M. I., GEIM, A. K. & NOVOSELOV, K. S. 2009. Control of Graphene's Properties by Reversible Hydrogenation: Evidence for Graphane. Science, 323, 610-613.

FANG, B., ZHOU, H. & HONMA, I. 2006. Ordered porous carbon with tailored pore size for electrochemical hydrogen storage application, The Journal of Physical Chemistry B, 110, 4875-4880.

FIGUEIREDO, J. L., PEREIRA, M. F. R., FREITAS, M. M. A, & ÓRFÃO, J. J. M. 1999, Modification of the surface chemistry of activated carbons. Carbon, 37, 1379-1389.

GUPTA, B., KUMAR, N., PANDA, K., KANAN, V., JOSH, S. & VISOLY-FISHER, I. 2017. Role of oxygen functional groups in reduced graphene oxide for lubrication. Scientific Reports, 7, 45030.

HEIDARI, S., SEIF MOHAMMADI, S., OBEROI, A. S. & ANDREWS, J. 2018, Technical feasibility of a proton battery with an activated carbon electrode. International Journal of Hydrogen Enemy, 43, 6197-6209.

HEO, Y.-J. & PARK, S.-J. 2018. H2O2/steam activation as an eco-friendly and efficient top-down approach to enhancing porosity on carbonaceous materials: the effect of inevitable oxygen functionalities on CO2 capture. Green Chemistry, 20, 5224-5234.

ISIKLI, S., LECEA, M., RIBAGORDA, M., CARREÑO, M. C. & DÍAZ, R. 2014. Influence of quinone grafting via Friedel—Crafts reaction on carbon porous structure and supercapacitor performance. Carbon, 66, 654-661.

JUREWICZ, K. 2009, Influence of charging parameters on the effectiveness of electrochemical hydrogen storage in activated carbon. International Journal of Hydrogen Energy, 34, 9431-9435.

JUREWICZ, K. & BABEL, K. 2008. KOH activated lignin based nanostructured carbon exhibiting high hydrogen electrosorption, Carbon, 46, 1948-1956.

JUREWICZ, K., FRACKOWIAK, E. & BÉGUIN, F. 2001. Enhancement of reversible hydrogen capacity into activated carbon through water electrolysis, Electrochemical and Solid-State Letters, 4, A27-A29.

JUREWICZ, K., FRACKOWIAK, E, & BÉGUIN, F. 2002. Electrochemical storage of hydrogen in activated carbons. Fuel processing technology, 77, 415-421.

KUN YANG, A, LIANGBO PENG A, DONG SHU A, B, D, CUIJUAN LV A, CHUN HE C, LU LONG A, 2013, Capacitive performance of a heteroatom-enriched activated carbon in concentrated sulfuric acid, Journal of Power Sources, 239, 553-560.

LAHAYE, J. 1998. The chemistry of carbon surfaces. Fuel, 77, 543-547.

MONTES-MORÁN, M. A., SUÁREZ, D., MENÉNDEZ, J. A. & FUENTE, E. 2004. On the nature of basic sites on carbon surfaces: An overview. Carbon. 42, 1219-1225.

MOURSHED M., REZAEI NIYA S. M., OJHA R., ROSENGARTEN G., ANDREWS J. AND SHABANI B., 2021, Carbon-Based Slurry Electrodes for Energy Storage and Power Supply Systems, Energy Storage Materials, Accepted for Publication NEVSKAIA, D. M. & MARTÍN-ARANDA, R. M. 2003. Nitric Acid-Oxidized Carbon for the Preparation of Esters Under Ultrasonic Activation. Catalysis Letters, 87, 143-147.

PELS, J. R, KAPTEIJN, F., MOULIJN, J, A., ZHU, Q. & THOMAS, K. M. 1995. Evolution of nitrogen functionalities in carbonaceous materials during pyrolysis. Carbon, 33, 1641-1653, POGNON, G., BROUSSE, T. & BÉLANGER, D. 2011a. Effect of molecular grafting on the pore size distribution and the double layer capacitance of activated carbon for electrochemical double layer capacitors. Carbon, 49, 1340-1348.

POGNON, G., BROUSSE, T., DEMARCONNAY, L. & BÉLANGER, D. 2011b. Performance and stability of electrochemical capacitor based on anthraquinone modified activated carbon, Journal of Power Sources, 196, 4117-4122.

ROLDÁN, S., BLANCO, C., GRANDA, M., MENÉNDEZ, R. & SANTAMARÍA, R. J. A. C. I. E. 2011a. Towards a further generation of high-energy carbon-based capacitors by using redox-active electrolytes. 50, 1699-1701.

ROLDÁN, S., GONZÁLEZ, Z., BLANCO, C., GRANDA, M., MENÉNDEZ, R, & SANTAMARÍA, R. J. E. A. 2011b. Redox-active electrolyte for carbon nanotube-based electric double layer capacitors, 56, 3401-3405.

ROLDÁN, S., GRANDA, M., MENÉNDEZ, R., SANTAMARÍA, R. & BLANCO, C. 2011c. Mechanisms of Energy Storage in Carbon-Based Supercapacitors Modified with a Quinoid Redox-Active Electrolyte. J. Phys. Chem. C, 115, 17606-17611.

SHAFEEYAN, M. S., DAUD, W. M. A. W., HOUSHMAND, A. & SHAMIRI, A. 2010. A review on surface modification of activated carbon for carbon dioxide adsorption. Journal of Analytical and Applied Pyrolysis, 89, 143-151.

SOFO, J. O., CHAUDHARI, A. S. & BARBER, G. D. 2007. Graphane: A two-dimensional hydrocarbon. Physical Review B, 75, 153401.

TAN, X., KOU, L., TAHINI, H. A. & SMITH, S. C. 2015, Charge Modulation in Graphitic Carbon Nitride as a Switchable Approach to High-Capacity Hydrogen Storage. ChemSusChem, 8, 3626-31.

TOYOTA, 2016. *Fuel cell vehicle technology file* [Online], Available: http://www.toyota-global.com/innovation/environmental_technology/technology_file/fuel_cell_hybrid.html#h306 [Accessed].

TOYOTA, 2017, 2017 Mirai Product Information, accessed from https://www.toyota.com/mirai/assets/core/Docs/Mirai%20Specs.pdf VIX-GUTERL, C., FRACKOWIAK, E., JUREWICZ, K., FRIEBE, M., PARMENTIER, J. & BÉGUIN, F. 2005. Electrochemical energy storage in ordered porous carbon materials. Carbon, 43, 1293-1302.

YANG, C., LI, Y. and CHEN, W., 2010. Electrochemical Hydrogen Storage Behavior Of Single-Walled Carbon Nanotubes (Swcnts) Coated With Ni Nanoparticles.

The invention claimed is:

1. A method of storing electrical energy as chemical energy, the method comprising:
   supplying an input slurry comprising uncharged storage particles and electrolyte to a first half-cell of an electrochemical cell;
   supplying a source of $H^+$ or $H_3O^+$ ions to a second half-cell of the electrochemical cell;
   applying a voltage to the electrochemical cell to:
      allow $H^+$ or $H_3O^+$ ions to pass from the second half cell to the first half-cell; and
      convert the uncharged storage particles to charged storage particles; and
   removing an output slurry comprising charged storage particles and electrolyte from the first half-cell.

2. The method according to claim 1, wherein the uncharged storage particles possess one or more of the following properties:
   (A) high electrical conductivity;
   (B) an average diameter of between 0.5 and 5 microns;
   (C) a porosity in the range 20% to 50%;
   (D) substantial ultramicropores with a diameter between 0.5 and 2 nanometres (nm) or substantial layered domains with an interlayer spacing between 0.5 and 2 nm;
   (E) mesopores with a diameter or width between 2 and 50 nm; and
   (F) an electrochemical hydrogen storage capacity of between 0.5 and 8 wt %.

3. The method according to claim 2, wherein the uncharged storage particles possess each of the properties (A)-(F) listed in claim 2.

4. The method according to claim 1, wherein the uncharged storage particles comprise carbon particles.

5. The method according to claim 4, wherein the carbon particles are selected from particles formed predominantly from one or more of the following materials:
   activated carbon, graphene, graphene functionalised with oxygen, graphene functionalised or doped with nitrogen, graphitic carbon nitrides, graphene aerogel, or carbon nanotubes.

6. The method according to claim 4, wherein the carbon particles comprise particles derived from phenolic resin and activated with potassium hydroxide.

7. The method according to claim 1, wherein the input slurry comprises 5-35% (w/w) of uncharged storage particles.

8. The method according to claim 1, wherein the source of $H^+$ or $H_3O^+$ ions supplied to the second half-cell is water.

9. The method according to claim 1, comprising:
   mixing uncharged storage particles and electrolyte to form the input slurry outside the first half-cell; and
   supplying the mixed input slurry to the first half-cell.

10. The method according to claim 1, further comprising separating charged storage particles from electrolyte in the output slurry after removing the output slurry from the first half-cell.

11. The method according to claim 10, wherein the step of separating charged storage particles from electrolyte comprises filtering the charged storage particles from the electrolyte.

12. The method according to claim 1, wherein the step of separating the charged storage particles from electrolyte comprises drying the charged storage particles.

13. The method according to claim 12, wherein the step of drying the charged storage particles comprises applying an inert gas to the charged storage particles.

14. The method according to claim 10, wherein charged storage particles are stored the after separating the charged particles from electrolyte.

15. The method according to claim 14, wherein during the step of storing the charged particles the charged storage particles are stored in an inert atmosphere.

16. A method of generating electricity, the method comprising:
   supplying an input slurry comprising charged storage particles and electrolyte to a first half-cell of an electrochemical cell;
   supplying an oxidant stream to a second half-cell of the electrochemical cell;
   allowing $H^+$ or $H_3O^+$ ions to pass from the first half-cell to react with the oxidant in the second half-cell, thereby generating electricity; and
   removing an output slurry comprising uncharged storage particles and electrolyte from the first half-cell.

17. The method according to claim 16, wherein the charged storage particles possess one or more of the following properties:
   (A) high electrical conductivity;
   (B) an average diameter of between 0.5 and 5 microns;
   (C) a porosity in the range 20% to 50%;
   (D) substantial ultramicropores with a diameter between 0.5 and 2 nanometres (nm) or substantial layered domains with an interlayer spacing between 0.5 and 2 nm;
   (E) mesopores with a diameter or width between 2 and 50 nm;
   (F) and an electrochemical hydrogen storage capacity of between 0.5 and 8 wt %.

18. The method according to claim 17, wherein the charged storage particles possess all of the properties (A) to (F) listed in claim 17.

19. The method according to claim 16, wherein the charged storage particles comprise carbon particles.

20. The method according to claim 19, wherein the carbon particles are selected from particles formed predominantly from one or more of the following materials: activated carbon, graphene, graphene functionalised with oxygen, graphene functionalised or doped with nitrogen, graphitic carbon nitrides, graphene aerogel, or carbon nanotubes.

21. The method according to claim 19, wherein the carbon particles comprise particles derived from phenolic resin and activated with potassium hydroxide.

22. The method according to claim 16, wherein the input slurry comprises 5-35% (w/w) of uncharged storage particles.

23. The method according to claim 16, wherein the charged storage particles have been produced and processed according to claim 1.

24. The method according to claim 16, wherein the oxidant stream supplied to the second half-cell comprises oxygen gas.

25. The method according to claim 24, wherein the oxidant stream supplied to the second half-cell is air.

26. The method according to claim 16, comprising a step of heating the cell while generating electricity.

27. The method according to claim 16, comprising:
mixing charged storage particles and electrolyte to form the input slurry outside the first half-cell; and
supplying the mixed input slurry to the first half-cell.

28. The method according to claim 16, further comprising separating uncharged storage particles from electrolyte after removing the output slurry from the first half-cell.

29. The method according to claim 28, wherein the step of separating uncharged storage particles from electrolyte comprises drying the uncharged storage particles.

30. The method according to claim 29, comprising storing the uncharged storage particles after separating the uncharged particles from electrolyte.

31. The method according to claim 1, wherein the electrochemical cell comprises a proton exchange membrane separating the first half-cell and the second half cell.

32. The method according to claim 1, wherein the steps of:
supplying the input slurry to the electrochemical cell; and
removing the output slurry from the electrochemical cell,
are performed as a continuous process.

33. The method according to claim 1, wherein the steps of:
supplying the input slurry to the electrochemical cell; and
removing the output slurry from the electrochemical cell,
are performed as a batch-wise process.

34. The method according to claim 1, wherein the electrolyte is selected from: a mineral acid in aqueous solution, an ionic liquid, an ionic liquid in aqueous solution, an organic acid in aqueous solution, or combinations thereof.

35. The method according to claim 1, comprising processing the input slurry through a plurality of electrochemical cells arranged in series to produce the output slurry.

36. The method according to claim 1, comprising processing the input slurry through a plurality of electrochemical cells arranged in parallel to produce the output slurry.

37. The method according to claim 1, wherein the charged storage particles comprise on average at least 0.5 wt % of captured hydrogen.

38. A method of generating hydrogen gas, the method comprising:
supplying an input slurry comprising charged storage particles and electrolyte to a first half-cell of an electrochemical cell;
allowing $H^+$ or $H_3O^+$ ions to pass from the first half-cell while ensuring that substantially no oxidant, or minimal oxidant, is present in the second half-cell;
initiating hydrogen gas evolution in the second half-cell; and
removing an output stream comprising hydrogen gas from the second half-cell.

39. The method according to claim 38, wherein the step of initiating hydrogen gas evolution comprises through one or more of:
applying a low potential to the electrochemical cell;
applying mild heat to the electrochemical cell; or
leaving the cell at rest for at least one hour.

40. The method according to claim 38, wherein the step of ensuring that substantially no oxidant, or minimal oxidant, is present in the second half-cell may comprise:
flooding the second half-cell with water,
filling the second half-cell with non-oxidising gases such as argon or nitrogen, or
by applying vacuum to the second half cell.

41. The method according to claim 38, wherein the method comprises generating electricity while generating hydrogen gas.

42. A system for performing the method according to claim 1, the system comprising an electrochemical cell, the electrochemical cell further comprising:
a first half-cell;
a second half-cell;
a proton exchange membrane separating the first half-cell from the second half-cell,
wherein the first half cell is configured to receive a slurry comprising storage particles and electrolyte.

43. The system according to claim 42, wherein the proton exchange membrane comprises a layer formed substantially of a tetrafluoroethylene-based fluoropolymer-copolymer.

44. The system according to claim 42, further comprising a pump to pump a slurry comprising storage particles and electrolyte into the first half-cell.

45. The system according to claim 42, further comprising a separator configured to:
receive an output slurry comprising storage particles and electrolyte from the first half-cell; and
separate storage particles from electrolyte.

46. The system according to claim 45, wherein the separator comprises a moving filter membrane.

47. The system according to claim 45, wherein the separator comprises a dryer.

48. The system according to claim 47, wherein the dryer is configured to pass an inert gas through the storage particles.

49. The system according to claim 45, further comprising a storage device configured to store storage particles separated from electrolyte.

50. The system according to claim 49, wherein the storage device is configured to store storage particles in an inert atmosphere.

51. The method according to claim 31, wherein the proton exchange membrane comprises a layer formed substantially of a tetrafluoroethylene-based fluoropolymer-copolymer.

52. The method according to claim 36, wherein the plurality of electrochemical cells are arranged in a stack.

53. The method according to claim 1, wherein the charged storage particles comprise on average 1.0-7.5 wt % of captured hydrogen.

* * * * *